United States Patent
Lee et al.

(10) Patent No.: US 9,509,207 B2
(45) Date of Patent: Nov. 29, 2016

(54) APPARATUS FOR COMPENSATING FOR RIPPLE AND OFFSET OF INVERTER AND METHOD THEREFOR

(71) Applicant: POSCO ENERGY CO., LTD, Seoul (KR)

(72) Inventors: Jeong Heum Lee, Gyeongsangbuk-do (KR); Sang Ho Moon, Gyeongsangbuk-do (KR); Ju Young Chang, Gyeongsangbuk-do (KR); Jae Sig Kim, Chungcheongbuk-do (KR)

(73) Assignee: POSCO ENERGY CO., LTD (KR)

( * ) Notice: Subject to any disclaimer, the term of this patent is extended or adjusted under 35 U.S.C. 154(b) by 47 days.

(21) Appl. No.: 14/442,618

(22) PCT Filed: Nov. 14, 2013

(86) PCT No.: PCT/KR2013/010328
§ 371 (c)(1),
(2) Date: May 13, 2015

(87) PCT Pub. No.: WO2014/077596
PCT Pub. Date: May 22, 2014

(65) Prior Publication Data
US 2016/0285355 A1    Sep. 29, 2016

(30) Foreign Application Priority Data

Nov. 14, 2012 (KR) .................. 10-2012-0128920
Dec. 11, 2012 (KR) .................. 10-2012-0143599
Dec. 18, 2012 (KR) .................. 10-2012-0148365

(51) Int. Cl.
*H02M 1/15*    (2006.01)
*H02M 1/14*    (2006.01)
(Continued)

(52) U.S. Cl.
CPC ................ *H02M 1/14* (2013.01); *H02M 7/42* (2013.01); *H02M 2001/0009* (2013.01)

(58) Field of Classification Search
CPC ........ H02M 1/08; H02M 1/084; H02M 1/15; H02M 7/537
USPC ....................................... 363/40, 95
See application file for complete search history.

(56) References Cited

U.S. PATENT DOCUMENTS 5,351,178 A * 9/1994 Brennen .................. H02J 3/01
                                                  323/207
5,852,551 A * 12/1998 Lee .................... H02M 7/53875
                                                  318/722
(Continued)

FOREIGN PATENT DOCUMENTS

JP        11089297        3/1999
JP        2001054300      2/2001
(Continued)

OTHER PUBLICATIONS

International Search Report, International Application No. PCT/KR2013/010328, dated Feb. 24, 2014.

*Primary Examiner* — Jeffrey Sterrett
(74) *Attorney, Agent, or Firm* — Perman & Green, LLP

(57) ABSTRACT

An apparatus and method for compensating for a ripple and offset of an inverter and an apparatus and method for compensating for a ripple and offset of an inverter which removes a ripple component by compensating for an offset component included in a signal input to the inverter from an inverter controller. A method that senses a direct current (DC) input to an inverter from an inverter controller and an alternating current (AC) output from the inverter and removes a ripple component included in the DC based on the sensed currents, a method that removes a ripple component included in a reference voltage that is output from an inverter controller and is input to an inverter, and a method that compensates for an offset component of an AC voltage/AC used for inverter control and reduces a ripple component corresponding to an output frequency of an inverter.

42 Claims, 18 Drawing Sheets

(51) Int. Cl.
   *H02M 7/42*   (2006.01)
   *H02M 1/00*   (2006.01)

(56) References Cited

U.S. PATENT DOCUMENTS

| | | | | |
|---|---|---|---|---|
| 6,229,719 | B1* | 5/2001 | Sakai | H02P 21/22 318/432 |
| 6,307,759 | B1* | 10/2001 | Inarida | H02M 5/451 363/37 |
| 7,034,493 | B2* | 4/2006 | Yoshimoto | H02P 21/06 318/629 |
| 2009/0129132 | A1* | 5/2009 | Furutani | H02M 7/4807 363/95 |
| 2009/0244937 | A1* | 10/2009 | Liu | H02M 1/4216 363/46 |
| 2010/0164416 | A1* | 7/2010 | Yamada | H02M 1/12 318/400.13 |
| 2011/0164443 | A1* | 7/2011 | Chen | H02M 7/53873 363/132 |
| 2011/0194318 | A1* | 8/2011 | Kono | H02M 7/53875 363/37 |
| 2013/0082636 | A1* | 4/2013 | Ohori | H02P 4/00 318/723 |
| 2013/0300327 | A1* | 11/2013 | Sekimoto | H02M 1/12 318/400.23 |
| 2015/0021914 | A1* | 1/2015 | Kim | H02P 9/007 290/44 |

FOREIGN PATENT DOCUMENTS

| | | |
|---|---|---|
| JP | 2001169578 | 6/2001 |
| JP | 2003143860 | 5/2003 |
| JP | 2004274960 | 9/2004 |
| JP | 4115696 | 7/2008 |
| JP | 2008286561 | 11/2008 |
| JP | 2009273330 | 11/2009 |
| JP | 4720334 | 7/2011 |
| JP | 5085224 | 11/2012 |
| KR | 1020120066520 | 6/2012 |

* cited by examiner

FIG. 9
<IDC AND OUTPUT CURRENT BEFORE COMPENSATION>
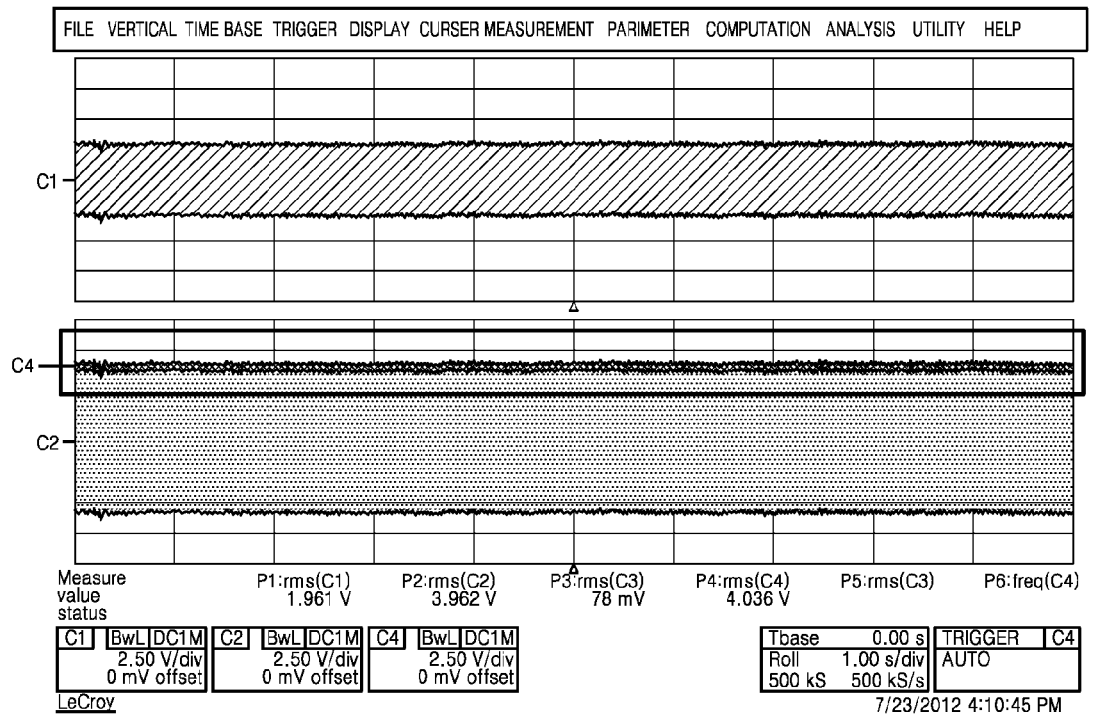
<IDC AND OUTPUT CURRENT AFTER COMPENSATION>
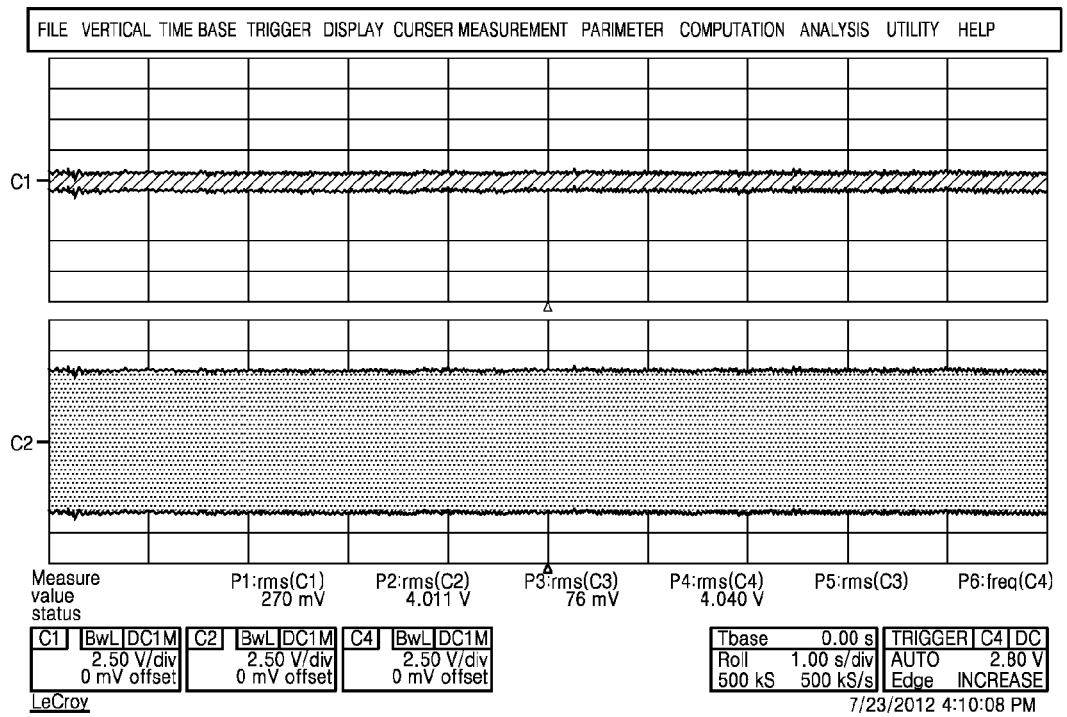

APPARATUS FOR COMPENSATING FOR RIPPLE AND OFFSET OF INVERTER AND METHOD THEREFOR

CROSS REFERENCE TO RELATED APPLICATIONS

This application is the National Stage of International Application No. PCT/KR2013/010328 having International filing date 14 Nov. 2013, which designated the United States of America, and which International Application was published under PCT Article 21 (s) as WO Publication 2014/077596 A1 and which claims priority from, and the benefit of, Korean Patent Application No. 10-2012-0128920, filed on 14 Nov. 2012, Korean Patent Application No. 10-2012-0143599, filed on 11 Dec. 2012, and Korean Patent Application No. 10-2012-0148365, filed on 18 Dec. 2012, the disclosures of which are incorporated herein by reference in their entireties.

BACKGROUND

The presently disclosed embodiment relates to an apparatus for compensating for a ripple and offset of an inverter and a method thereof, and more particularly, to an apparatus for compensating for a ripple and offset of an inverter which removes a ripple component by compensating for an offset component included in a signal that is input to the inverter from an inverter controller and a method thereof.

A balance of plant (BOP) refers to a system that produces electricity in an electrochemical reaction between oxygen in the air and hydrogen that is included in a fuel. The demand for a BOP has increased because the BOP uses about 30% less fuel than what a thermal-power generation system uses and emits fewer pollutants.

FIG. 1 is a diagram illustrating a general BOP.

As shown in FIG. 1, the general BOP includes a mechanical balance of plant (MBOP) 1A, a fuel cell (FC) stack 1B, and an electrical balance of plant (EBOP) 1C.

The MBOP 1A receives the air and a fuel, extracts oxygen from the air and hydrogen from the fuel, and supplies the oxygen and the hydrogen to the FC stack 1B. The FC stack 1B generates a direct current (DC) in an electrochemical reaction between the hydrogen and the oxygen. The EBOP 1C converts the DC into an alternating current (AC) that may be finally used and supplies the AC.

The EBOP 1C that is a power conversion system for connecting DC power generated in the FC stack 1B to a power grid such as Korea Electric Power Corporation (KEPCO) plays an important role in determining the performance of the BOP. The EBOP 1C operates in a grid-connected operation mode in which the EBOP 1C is connected to the power grid or an islanded operation mode in which the EBOP 1C is not connected to the power grid and independently supplies power to a load.

When an offset is generated in a signal that is used to control an inverter such as the EBOP 1C, an output signal may be distorted and a temperature of a transformer may be increased.

Accordingly, there is a demand for a method of removing a ripple component by compensating for the offset that is generated in the signal that is used to control the inverter.

SUMMARY

The presently disclosed embodiment provides a method and apparatus which may remove an offset component of a signal that is input to an inverter.

In particular, the presently disclosed embodiment provides an apparatus and method of compensating for a current ripple of an inverter which may prevent a waveform of an alternating current (AC) that is output from the inverter from being distorted by sensing a direct current (DC) that is input to the inverter from an inverter controller and the AC that is output from the inverter and removing a ripple component that is included in the DC based on the sensed currents.

The presently disclosed embodiment also provides an apparatus and method of compensating for a voltage ripple of an inverter which may prevent waveforms of an AC that is output from the inverter and a DC that is input to the inverter from being distorted by removing a ripple component that is included in a reference voltage that is output from an inverter controller and is input to the inverter.

The presently disclosed embodiment also provides a method and apparatus for compensating for an offset of a signal for inverter control which may reduce a ripple component corresponding to an output frequency of an inverter by compensating for an offset component of an AC voltage/AC that is used for the inverter control.

The technical objectives of the presently disclosed embodiment are not limited to the above disclosure. Other objects and advantages of the presently disclosed embodiment will become more apparent by describing in detail exemplary aspects thereof with reference to the attached drawings. Also, it is to be easily understood that the objectives and advantages of the presently disclosed embodiment could be realized through means and combinations thereof shown in the claims.

According to an aspect of the presently disclosed embodiment, there is provided an apparatus for compensating for a current ripple of an inverter, the apparatus including: a current sensor that senses a direct current (DC) that is input to the inverter and an alternating current (AC) that is output from the inverter; a coordinate converter that converts the AC that is sensed by the current sensor into a synchronous coordinate system; a ripple extractor that extracts a ripple by using the DC that is sensed by the current sensor and an AC of the synchronous coordinate system that is obtained by the coordinate converter; a compensation value generator that generates a compensation value based on the ripple that is extracted by the ripple extractor; and a ripple compensator that removes the ripple of the DC by using the compensation value that is generated by the compensation value generator.

According to another aspect of the presently disclosed embodiment, there is provided a method of compensating for a current ripple of an inverter, the method including: sensing a direct current (DC) that is input to the inverter and an alternating current (AC) that is output from the inverter, wherein the sensing is performed by a current sensor; converting the sensed AC into a synchronous coordinate system, wherein the converting is performed by a coordinate converter; extracting a ripple by using the sensed DC and an AC of the obtained synchronous coordinate system, wherein the extracting is performed by a ripple extractor; generating a compensation value based on the extracted ripple, wherein the generating is performed by using a compensation value generator; and removing the ripple of the DC by using the generated compensation value, wherein the removing is performed by a ripple compensator.

According to another aspect of the presently disclosed embodiment, there is provided an apparatus for compensating for a voltage ripple of an inverter, the apparatus including: a reference voltage input unit that receives a reference voltage for inverter control; a ripple extractor that extracts a ripple from the reference voltage that is received by the reference voltage input unit; a delay compensation unit that compensates for a time delay of the ripple that is extracted by the ripple extractor; a ripple compensator that compensates for a ripple of the reference voltage that is input to the inverter based on the ripple whose time delay is compensated for by the delay compensation unit; and a coordinate converter that converts the reference voltage whose ripple is compensated for by the ripple compensator into a stationary coordinate system.

According to another aspect of the presently disclosed embodiment, there is provided a method of compensating for a voltage ripple of an inverter, the method including: receiving a reference voltage for inverter control, wherein the receiving is performed by a reference voltage input unit; extracting a ripple from the received reference voltage, wherein the extracting is performed by a ripple extractor; compensating for a time delay of the extracted ripple, wherein the compensating is performed by a delay compensator; compensating for a ripple of the reference voltage that is input to the inverter based on the ripple whose time delay is compensated for, wherein the compensating is performed by a ripple compensator; and converting the reference voltage whose ripple is compensated for into a stationary coordinate system, wherein the converting is performed by a coordinate converter.

According to another aspect of the presently disclosed embodiment, there is provided a method of compensating for an offset of a signal for inverter control, the method including: sampling and detecting an input alternating current (AC) voltage for controlling an inverter at each predetermine time interval; calculating a voltage sum value of the input AC voltage that is detected at each predetermined time interval; determining whether a cycle of the input AC voltage is equal to or greater than a predetermined cycle; when it is determined that the cycle of the input AC voltage is equal to or greater than the predetermined cycle, calculating a voltage average value per cycle of the voltage sum value; determining whether the calculated voltage average value exceeds a first critical value; and when it is determined that the calculated voltage average value exceeds the first critical value, compensating for an offset component corresponding to the voltage average value.

The determining of whether the cycle of the input AC voltage is equal to or greater than the predetermined cycle may include counting a number of times a magnitude of the input AC voltage changes from a negative value to a positive value or a number of times the magnitude of the input AC voltage changes from a positive value to a negative value.

The method may further include: determining whether the voltage average value exceeds a second critical value; and when it is determined that the voltage average value exceeds the second critical value, outputting an alarm signal indicating that there is abnormality in the input AC voltage.

According to another aspect of the presently disclosed embodiment, there is provided a method of compensating for an offset of a signal for inverter control, the method including: sampling and detecting an input alternating current (AC) for controlling an inverter at each predetermined time interval; calculating a current sum value of the input AC that is detected at each predetermined time interval; determining whether a cycle of the input AC is equal to or greater than a predetermined cycle; when it is determined that the cycle of the input AC is equal to or greater than the predetermined cycle, calculating a current average value per cycle of the current sum value; determining whether the calculated current average value exceeds a third critical value; and when it is determined that the current average value exceeds the third critical value, compensating for an offset component corresponding to the current average value.

The determining of whether the cycle of the input AC is equal to or greater than the predetermined cycle may include counting a number of times a magnitude of the input AC changes from a negative value to a positive value or a number of times the magnitude of the input AC changes from a positive value to a negative value.

The method may further include, after the detecting of the input AC, determining whether a magnitude of the input AC is equal to or greater than a predetermined current value, and when it is determined that the magnitude of the input AC is equal to or greater than the predetermined current value, calculating the current sum value of the input AC, and when it is determined that the magnitude of the input AC is less than the predetermined current value, detecting the input AC.

The method may further include: determining whether the current average value exceeds a fourth critical value; and when it is determined that the current average value exceeds the fourth critical value, outputting an alarm signal indicating that there is an abnormality in the input AC.

According to another aspect of the presently disclosed embodiment, there is provided an apparatus for compensating for an offset of a signal for inverter control, the apparatus including: a voltage detector that samples and detects an input alternating current (AC) voltage for controlling an inverter at each predetermined time interval; a voltage sum unit that calculates a voltage sum value of the input AC voltage that is detected at each predetermined time interval; a voltage cycle detector that determines whether a cycle of the input AC voltage is equal to or greater than a predetermined cycle; a voltage average value calculator that, when it is determined that the cycle of the input AC voltage is equal to or greater than the predetermined cycle, calculates a voltage average value per cycle of the voltage sum value; and a voltage offset compensator that determines whether the calculated voltage average value exceeds a first critical value, and when it is determined that the voltage average value exceeds the first critical value, compensates for an offset component corresponding to the voltage average value.

The voltage cycle detector may determine the cycle of the input AC voltage by counting a number of times a magnitude of the input AC voltage changes from a negative value to a positive value or a number of times the magnitude of the input AC voltage changes from a positive value to a negative value.

The apparatus may further include a voltage alarm signal output unit that outputs an alarm signal indicating that there is an abnormality in the input AC voltage, wherein the voltage offset compensator determines whether the voltage average value exceeds a second critical value, and when it is determined that the voltage average value exceeds the second critical value, controls the voltage alarm signal output unit to output the alarm signal.

According to another aspect of the presently disclosed embodiment, there is provided an apparatus for compensating for an offset of a signal for inverter control, the apparatus including: a current detector that samples and detects an input alternating current (AC) for controlling an inverter at each predetermined time interval; a current summing unit that calculates a current sum value of the input AC that is detected at each predetermined time interval; a current cycle detector that determines whether a cycle of the input AC is equal to or greater than a predetermined cycle; a current average value calculator that, when it is determined that the cycle of the input AC is equal to or greater than the predetermined cycle, calculates a current average value per cycle of the current sum value; and a current offset compensator that determines whether the calculated current average value exceeds a third critical value, and when it is determined that the current average value exceeds the third critical value, compensates for an offset component corresponding to the current average value.

The apparatus may further include a current comparator that determines whether a magnitude of the input AC is equal to or greater than a predetermined current value, wherein when it is determined that the magnitude of the input AC is equal to or greater than the predetermined current value, the current summing unit calculates the current sum value of the input AC, and when it is determined that the magnitude of the input AC is less than the predetermined current value, the current detector detects the input AC.

The current cycle detector may determine the cycle of the input AC by counting a number of times a magnitude of the input AC changes from a negative value to a positive value or a number of times the magnitude of the input AC changes from a positive value to a negative value.

The apparatus may further include a current alarm signal output unit that outputs an alarm signal indicating that there is an abnormality in the input AC, wherein the current offset compensator determines whether the current average value exceeds a fourth critical value, and when it is determined that the current average value exceeds the fourth critical value, controls the current alarm signal output unit to output the alarm signal.

The presently disclosed embodiment may prevent a waveform of an alternating current (AC) that is output from an inverter from being distorted by compensating for an offset of a signal that is input to the inverter from an inverter controller.

BRIEF DESCRIPTION OF THE DRAWINGS

FIG. 9 is a diagram illustrating a result obtained after performing performance analysis on an apparatus for compensating for a current ripple of an inverter, according to an exemplary aspect of the presently disclosed embodiment.

Description of Major Reference Numerals

| | |
|---|---|
| 31: current sensor | 32: coordinate converter |
| 33: ripple extractor | 34: compensation value generator |
| 35: ripple compensator | |
| 231: reference voltage input unit | 232: ripple extractor |
| 233: delay compensation unit | 234: ripple compensator |
| 235: coordinate converter | 300: voltage detector |
| 310: voltage summing unit | 320: voltage cycle detector |
| 330: voltage average value calculator | 340: voltage offset compensator |
| 350: voltage alarm signal output unit | 400: current detector |
| 410: current comparator | 420: current summing unit |
| 430: current cycle detector | 440: current average value calculator |
| 450: current offset compensator | 460: current alarm signal output unit |

DETAILED DESCRIPTION

The above objectives, features, and advantages of the presently disclosed embodiment will become more apparent by describing in detail exemplary aspects thereof with reference to the attached drawings, and thus the presently disclosed embodiment could be easily made and used by one of ordinary skill in the art. However, when publicly known techniques related to the presently disclosed embodiment may unnecessarily make the presently disclosed embodiment unclear, the detailed description will be omitted. The presently disclosed embodiment will now be described more fully with reference to the accompanying drawings, in which exemplary aspects of the disclosed embodiment are shown.

Three methods of compensating for an offset are used in the presently disclosed embodiment.

First, there is a method that prevents a waveform of an alternating current (AC) that is output from an inverter from being distorted by sensing a direct current (DC) that is input to the inverter from an inverter controller and the AC that is output from the inverter and removing a ripple component that is included in the DC based on the sensed currents.

Second, there is a method that prevents waveforms of an AC that is output from an inverter and a DC that is input to the inverter by removing a ripple component that is included in a reference voltage that is output from an inverter controller and is input to the inverter.

Third, there is a method that reduces a ripple component corresponding to an output frequency of an inverter by compensating for an offset component of an AC voltage/AC that is used for inverter control.

The three methods will now be explained in more detail.

1. Method that Removes Ripple Component that is Included in DC by Using Sensed Currents FIG. 2 is a diagram illustrating a configuration of an inverter control system to which the presently disclosed embodiment is applied.

Figure 1:
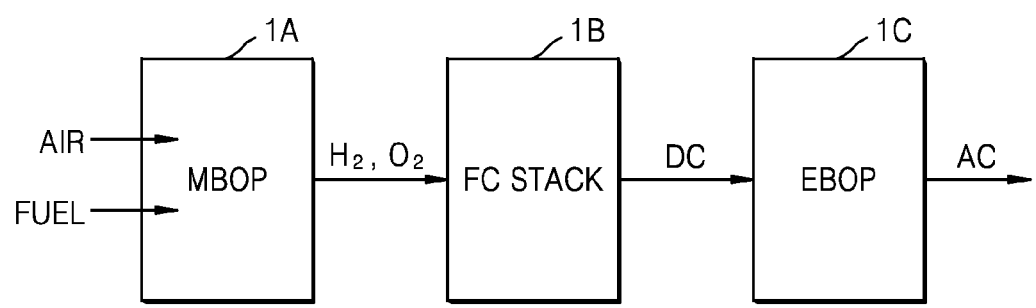
FIG. 1 is a diagram illustrating a general balance of plant (BOP).
Figure 2:
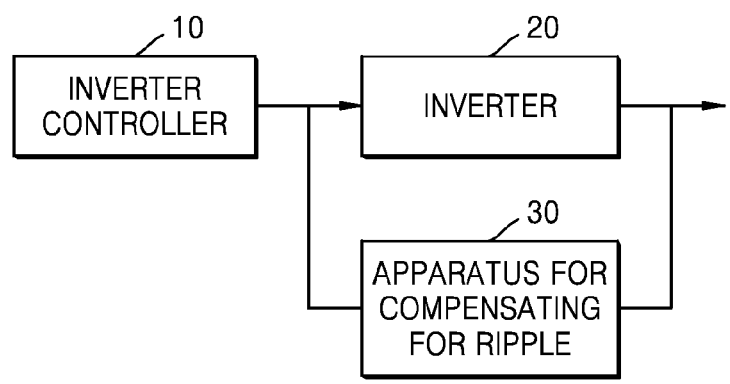
FIG. 2 is a diagram illustrating a configuration of an inverter control system to which the presently disclosed embodiment is applied.

As shown in FIG. 2, the inverter control system to which the presently disclosed embodiment is applied includes an inverter controller 10, an inverter 20, and an apparatus 30 for compensating for a ripple.

First, the inverter controller 10 inputs a voltage/current/power for controlling the inverter 20 to the inverter 20. In this case, when a frequency component (for example, 60 Hz corresponding to an output frequency) is included in a DC that is input to the inverter 20, a waveform of an AC that is output from the inverter 20 is distorted.

In order to prevent this problem, the apparatus 30 according to the presently disclosed embodiment senses the DC that is input to the inverter 20 from the inverter controller 10 and the AC that is output from the inverter 20, generates a compensation value for compensating for a ripple component that is included in the DC that is input to the inverter 20 based on the sensed DC and AC, and removes the ripple component of the DC by using the compensation value.

In this case, the apparatus 30 converts the sensed AC into a synchronous coordinate system by using a process that varies according to a type of the inverter 20. That is, when the inverter 20 is a 3-phase inverter, the apparatus 30 converts the sensed AC (e.g., a U-phase current, a V-phase current, or a W-phase current) into a 2-phase stationary coordinate system, and converts again the 2-phase stationary coordinate system into a synchronous coordinate system. Also, when the inverter 20 is a single-phase inverter, the apparatus 30 converts the sensed AC and an AC obtained by shifting the sensed AC by 90° into a synchronous coordinate system.

A conversion process into a stationary coordinate system and a conversion process into a synchronous coordinate system in the presently disclosed embodiment are well known, and thus a detailed explanation thereof will not be given.

Also, the apparatus 30 extracts a ripple component corresponding to an output frequency from the sensed DC and the AC converted into the synchronous coordinate system by using any of various filters such as a band-stop filter (BSF), a band-pass filter (BPF), or an all-pass filter (APF).

Also, in order to generate a ripple compensation value (for example, a voltage) that is used to remove a frequency component that is included in the sensed DC, the apparatus 30 generates a ripple compensation value by using a DC of the synchronous coordinate system and an AC of the synchronous coordinate system for one phase of a 2-phase output current of the synchronous coordinate system.

Figure 3:
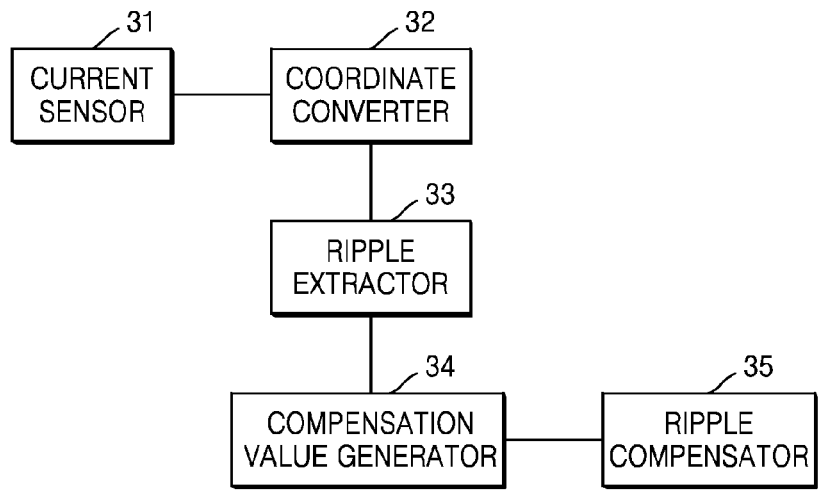
FIG. 3 is a diagram illustrating a configuration of an apparatus for compensating for a current ripple of an inverter, according to an exemplary aspect of the presently disclosed embodiment.

FIG. 3 is a diagram illustrating a configuration of the apparatus 30 for compensating for a current ripple of an inverter, according to an exemplary aspect of the presently disclosed embodiment.

As shown in FIG. 3, the apparatus 30, according to the presently disclosed embodiment, includes a current sensor 31, a coordinate converter 32, a ripple extractor 33, a compensation value generator 34, and a ripple compensator 35.

Each of the elements will now be explained. First, the current sensor 31 senses a DC that is input to the inverter 20 from the inverter controller 10 and an AC that is output from the inverter 20.

Next, the coordinate converter 32 converts the AC that is sensed by the current sensor 31 into a 2-phase synchronous coordinate system.

In this case, when the inverter 20 is a 3-phase inverter, the coordinate converter 32 converts a 3-phase AC (e.g., an output U-phase current, an output V-phase current, or an output W-phase current) into a 2-phase stationary coordinate system and then converts again the 2-phase stationary coordinate system into a 2-phase synchronous coordinate system. Also, when the inverter 20 is a single-phase inverter, the coordinate converter 32 converts a single-phase AC (e.g., an output current) and an AC obtained by shifting a phase of the single-phase AC by 90° into a 2-phase synchronous coordinate system.

The coordinate converter 32 transmits the DC that is sensed by the current sensor 31 to the ripple extractor 33 without converting the DC that is sensed by the current sensor 31 into a synchronous coordinate system.

Next, the ripple extractor 33 extracts a ripple based on the DC that is sensed by the current sensor 31 and an AC of the synchronous coordinate system obtained by the coordinate converter 32.

Next, the compensation value generator 34 generates a compensation value based on the ripple that is extracted by the ripple extractor 33.

Next, the ripple compensator 35 removes a ripple that is included in the DC that is output from the inverter controller 10 by using the compensation value that is generated by the compensation value generator 34. That is, the ripple compensator 35 removes the ripple that is included in the DC by adding the compensation value to a voltage that is output from the inverter controller 10.

The coordinate converter 32, the ripple extractor 33, and the compensation value generator 34 will now be explained in more detail with reference to FIGS. 4 through 8.

Figure 4:
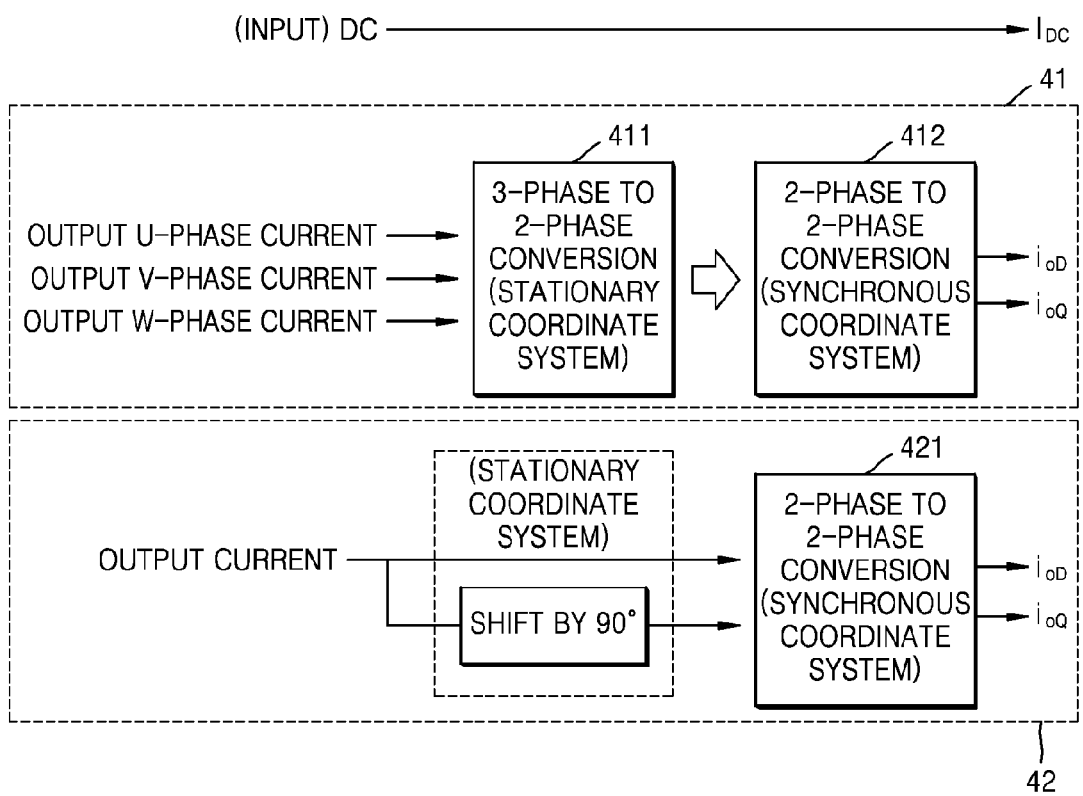
FIG. 4 is a detailed diagram illustrating a configuration of a coordinate converter, according to an exemplary aspect of the presently disclosed embodiment.

FIG. 4 is a detailed diagram illustrating a configuration of the coordinate converter 3, according to an exemplary aspect of the presently disclosed embodiment.

As shown in FIG. 4, the coordinate converter 32 according to the presently disclosed embodiment includes a first coordinate converter 41 that converts a 3-phase AC that is sensed by the current sensor 31 and is output from a 3-phase inverter into a 2-phase synchronous coordinate system, and a second coordinate converter 42 that converts a single-phase AC that is sensed by the current sensor 31 and is output from a single-phase inverter into a 2-phase synchronous coordinate system.

In more detail, the first coordinate converter 41 converts a 3-phase AC (e.g., an output U-phase current, an output V-phase current, or an output W-phase current) that is sensed by the current sensor 31 into a 2-phase stationary coordinate system, and converts again the 2-phase stationary coordinate system into a 2-phase synchronous coordinate system. An AC of the converted synchronous coordinate system is represented as $i_{oD}$ or $I_{oQ}$.

Next, the second coordinate converter 42 converts an AC obtained by shifting by 90° a phase of a single-phase AC (e.g., an output current) that is sensed by the current sensor 31 and the single-phase AC into a 2-phase synchronous coordinate system. An AC of the converted synchronous coordinate system is also represented as $i_{oD}$ or $I_{oQ}$.

Figure 5:
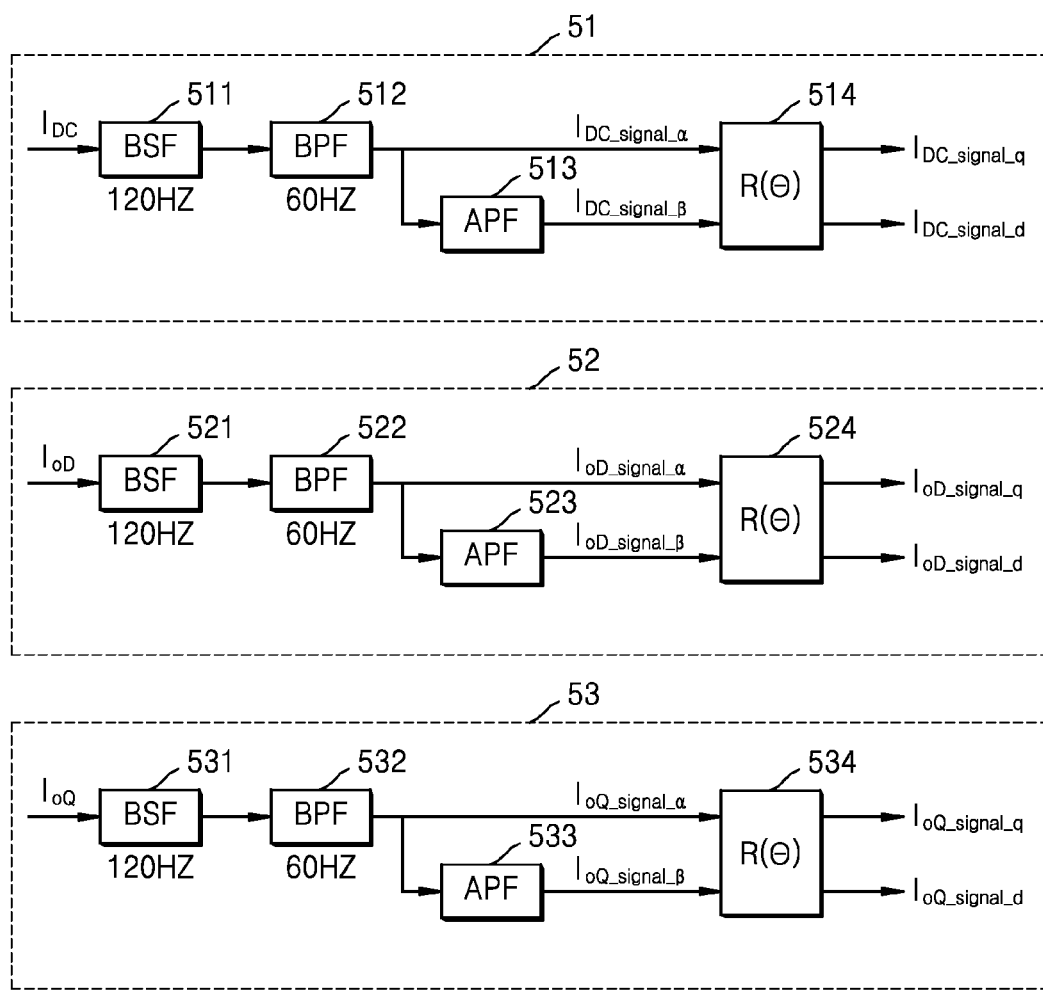
FIG. 5 is a detailed diagram illustrating a configuration of a ripple extractor, according to an exemplary aspect of the presently disclosed embodiment.

FIG. 5 is a detailed diagram illustrating a configuration of the ripple extractor 33, according to an exemplary aspect of the presently disclosed embodiment.

As shown in FIG. 5, the ripple extractor 33 according to the presently disclosed embodiment includes a first ripple extractor 51, a second ripple extractor 52, and a third ripple extractor 53.

First, the first ripple extractor 51 extracts a first ripple from a DC $I_{DC}$ that is sensed by the current sensor 31, and converts the extracted first ripple and a ripple obtained by shifting a phase of the extracted first ripple by 90° into a synchronous coordinate system. In this case, a q-axis ripple of the synchronous coordinate system is $I_{DC\_signal\_q}$ and a d-axis ripple of the synchronous coordinate system is $I_{DC\_signal\_d}$.

The first ripple extractor 51 includes a BSF 511, a BPF 512, an APF 513, and a synchronous coordinate converter 514.

The BSF 511 removes a twice component of an output frequency (generally 60 Hz) in a DC that is sensed by the current sensor 31.

The BPF 512 extracts a first ripple corresponding to the output frequency from a DC that passes through the BSF 511.

The APF 513 shifts by 90° the first ripple that is extracted by the BPF 512.

The synchronous coordinate converter 514 converts the first ripple that is extracted by the BPF 512 and a ripple obtained by 90°-shifting of the APF 513 into a synchronous coordinate system.

Next, the second ripple extractor 52 extracts a second ripple from the AC $i_{oD}$ of the synchronous coordinate system obtained by the coordinate converter 32, and converts again the extracted second ripple and a ripple obtained by shifting the extracted second ripple by 90° into a synchronous coordinate system. In this case, a q-axis ripple of the synchronous coordinate system is $i_{oD\_signal\_q}$ and a d-axis ripple of the synchronous coordinate system is $i_{oD\_signal\_d}$.

The second ripple extractor 52 includes a BSF 521, a BPF 522, an APF 523, and a synchronous coordinate converter 524.

The BSF 521 removes a twice component of an output frequency (generally 60 Hz) in the AC $i_{oD}$ of the synchronous coordinate system obtained by the coordinate converter 32.

The BPF 522 extracts a second ripple corresponding to the output frequency from an AC that passes through the BSF 521.

The APF 523 shifts by 90° the second ripple that is extracted by the BPF 522.

The synchronous coordinate converter 524 converts again the second ripple that is extracted by the BPF 522 and a ripple obtained by the APF 523 by shifting the extracted second ripple by 90° into a synchronous coordinate system.

Next, the third ripple extractor 53 extracts a third ripple from the AC $I_{oQ}$ of the synchronous coordinate system obtained by the coordinate converter 32, and converts again the extracted third ripple and a ripple obtained by shifting the extracted third ripple by 90° into a synchronous coordinate system. In this case, a q-axis ripple of the synchronous coordinate system is $i_{oQ\_signal\_q}$ and a d-axis ripple of the synchronous coordinate system is $i_{oQ\_signal\_d}$.

The third ripple extractor 53 includes a BSF 531, a BPF 532, an APF 533, and a synchronous coordinate converter 534.

The BSF 531 removes a twice component of an output frequency (generally 60 Hz) in the AC $I_{oQ}$ of the synchronous coordinate system obtained by the coordinate converter 32.

The BPF 532 extracts a third ripple corresponding to the output frequency from an AC that passes through the BSF 531.

The APF 533 shifts by 90° the third ripple that is extracted by the BPF 532.

The synchronous coordinate converter 534 converts again the third ripple that is extracted by the BPF 532 and a ripple obtained by the APF 523 by shifting the extracted third ripple by 90° into a synchronous coordinate system.

Figure 6:
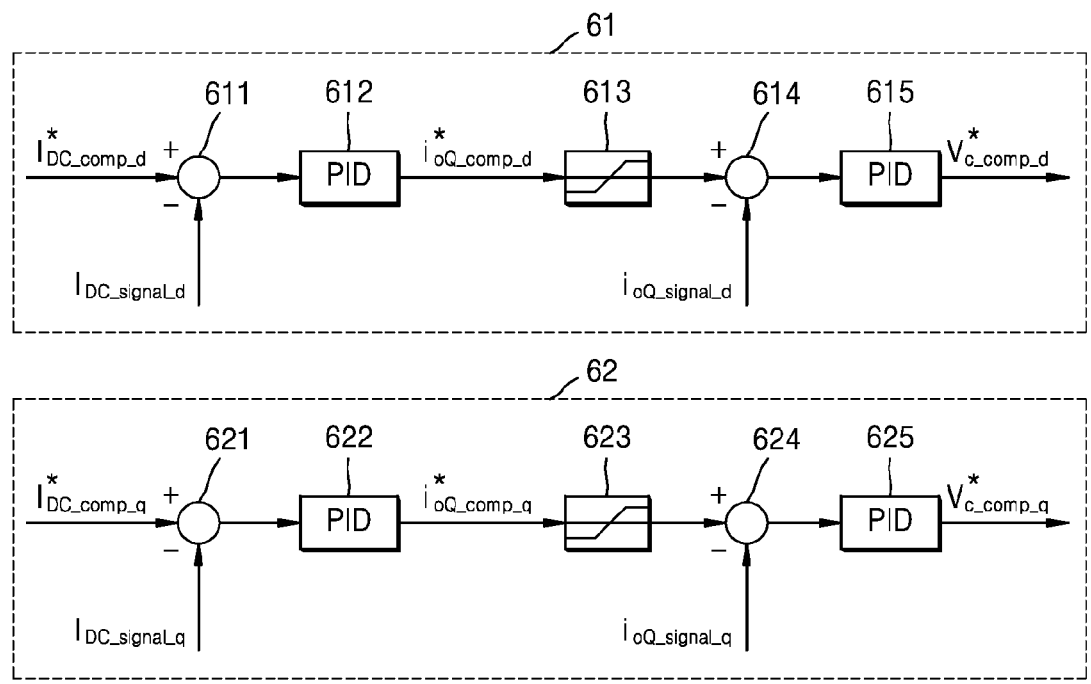
FIG. 6 is a detailed diagram illustrating a configuration of a compensation value generator, according to an exemplary aspect of the presently disclosed embodiment.

FIG. 6 is a detailed diagram illustrating a configuration of the compensation value generator 34, according to an exemplary aspect of the presently disclosed embodiment.

As shown in FIG. 6, the compensation value generator 34 according to the presently disclosed embodiment includes a first generator 61 that generates a first axis voltage value of a stationary coordinate system, and a second generator 62 that generates a second axis voltage value of the stationary coordinate system.

In a first exemplary aspect, the first generator 61 generates a first axis voltage of a stationary coordinate system based on a first axis ripple $I_{DC\_signal\_d}$ of a synchronous coordinate system for a DC that is extracted by the first ripple extractor 51 and a first axis ripple $i_{oQ\_signal\_d}$ of the synchronous coordinate system for the AC $I_{oQ}$ that is extracted by the third ripple extractor 53.

Next, the second generator 62 generates a second axis voltage of the stationary coordinate system based on a second axis ripple $I_{DC\_signal\_q}$ of the synchronous coordinate system for the DC that is extracted by the first ripple extractor 51 and a second axis ripple $i_{oQ\_signal\_q}$ of the synchronous coordinate system for the AC $I_{oQ}$ that is extracted by the third ripple extractor 53.

A configuration of each of the first generator 61 and the second generator 62 will now be explained in detail.

First, the first generator 61 includes a first subtractor 611, a first proportional integral derivative (PID) controller 612, a limit controller 613, a second subtractor 614, and a second PID controller 615.

The first subtractor 611 subtracts the first axis ripple $I_{DC\_signal\_d}$ of the synchronous coordinate system for the DC from a first axis command $I^*_{DC\_signal\_d}$ of the synchronous coordinate system for a magnitude of a DC ripple current.

The first PID controller 612 controls an output of the first subtractor 611 by using a PID.

The limit controller 613 limits an output of the first PID controller 612 to a critical value or less.

The second subtractor 614 subtracts the first axis ripple $i_{oQ\_signal\_d}$ of the synchronous coordinate system for the AC $I_{oQ}$ from an output of the limit controller 613.

The second PID controller 615 outputs a first axis voltage in a stationary coordinate system by controlling an output of the second subtractor 614 by using a PID.

Next, the second generator 62 includes a first subtractor 621, a first PID controller 622, a limit controller 623, a second subtractor 624, and a second PID controller 625.

The first subtractor 621 subtracts the second axis ripple $I_{DC\_signal\_q}$ of the synchronous coordinate system for the DC from a second axis command $I^*_{DC\_signal\_q}$ of the synchronous coordinate system for a DC ripple current.

The first PID controller 622 controls an output of the first subtractor 621 by using a PID.

The limit controller 623 limits an output of the first PID controller 622 to a critical value or less.

The second subtractor 624 subtracts the second axis ripple $i_{oQ\_signal\_q}$ of the synchronous coordinate system for the AC $I_{oQ}$ from an output of the limit controller 623.

The second PID controller 625 outputs a second axis voltage in the stationary coordinate system by controlling an output of the second subtractor 624 by using a PID.

In the presently disclosed embodiment, it is preferable that the first axis command $I^*_{DC\_signal\_d}$ and the second axis command $I^*_{DC\_signal\_q}$ of the synchronous coordinate system for the DC ripple current generally have a ripple magnitude of 0 (zero).

In a second exemplary aspect, a compensation value may be generated based on a first axis ripple $i_{oD\_signal\_d}$ and a second axis ripple $i_{oD\_signal\_q}$ of the synchronous coordinate system for the AC $i_{oD}$ that is extracted by the second ripple extractor 52.

That is, the first generator 61 generates a first axis voltage in the stationary coordinate system based on the first axis ripple $I_{DC\_signal\_d}$ of the synchronous coordinate system for the DC that is extracted by the first ripple extractor 51 and the first axis ripple $i_{oD\_signal\_d}$ of the synchronous coordinate system for the AC $i_{oD}$ that is extracted by the second ripple extractor 52.

Next, the second generator 62 generates a second axis voltage in the stationary coordinate system based on the second axis ripple $I_{DC\_signal\_q}$ of the synchronous coordinate system for the DC that is extracted by the first ripple extractor 51 and the second axis ripple $i_{oD\_signal\_q}$ of the synchronous coordinate system for the AC $i_{oD}$ that is extracted by the second ripple extractor 52.

Figure 7:
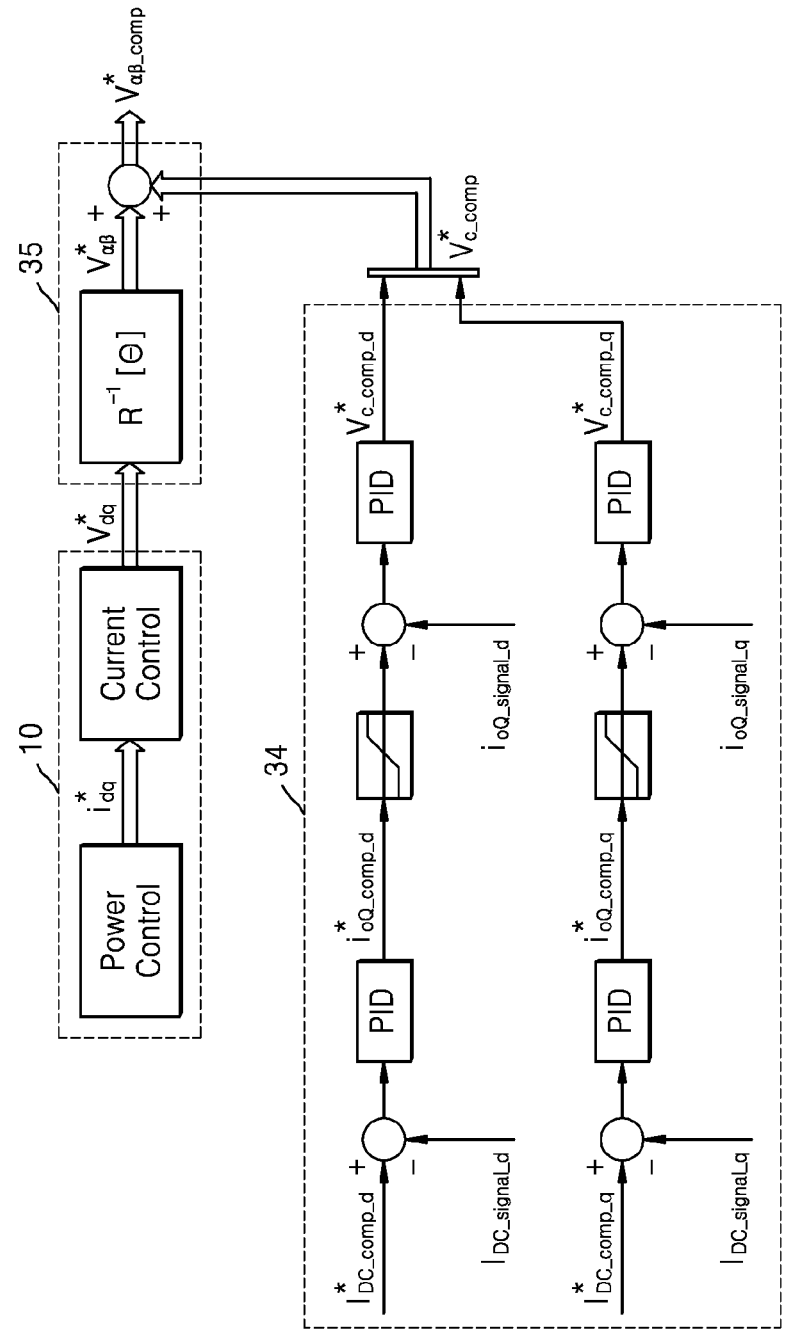
FIG. 7 is a diagram for explaining a ripple compensation process of a ripple compensator, according to an exemplary aspect of the presently disclosed embodiment.

In the first and second exemplary aspects, a final resultant value is a value of the stationary coordinate system. Accordingly, the ripple compensator 35 performs compensation on the stationary coordinate system as shown in FIG. 7. That is, the ripple compensator 35 performs compensation by converting a voltage $v^*_{dq}$ of a synchronous coordinate system for inverter control that is output from the inverter controller 10 into a voltage $v^*_{\alpha\beta}$ of a stationary coordinate system and adding the voltage $v^*_{\alpha\beta}$ of the stationary coordinate system to a voltage of the stationary coordinate system that is generated by the compensation value generator 34. That is, the ripple compensator 35 outputs a voltage $v^*_{\alpha\beta\_comp}$ for pulse width modulation (PWM).

Figure 8:
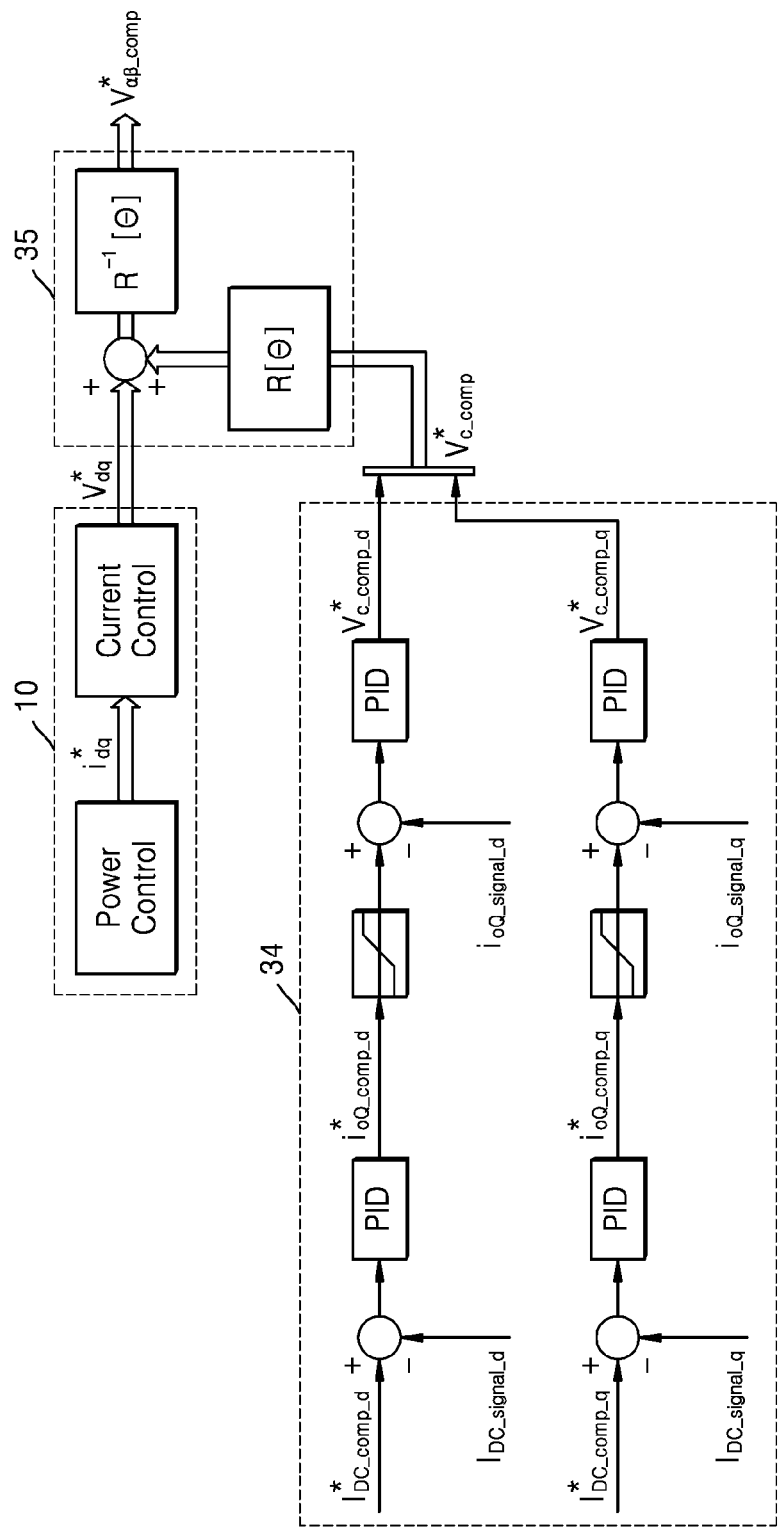
FIG. 8 is a diagram for explaining a ripple compensation process of the ripple compensator, according to another exemplary aspect of the presently disclosed embodiment.

However, the ripple compensator 35 may perform compensation on a synchronous coordinate system as shown in FIG. 8. That is, the ripple compensator 35 may perform compensation by converting a voltage $v^*_{c\_comp}$ of a stationary coordinate system that is generated by the compensation value generator 34 into a voltage of the synchronous coordinate system and adding the voltage of the synchronous coordinate system to the voltage $v^*_{dq}$ of the synchronous coordinate system that is output from the inverter controller 10. In this case, it is preferable that a result obtained after the compensation performed on the synchronous coordinate system is converted into a stationary coordinate system and the stationary coordinate system is output. That is, the voltage $v^*_{\alpha\beta\_comp}$ for PWM is output.

FIG. 9 is a diagram illustrating a result obtained after performing performance analysis on an apparatus for compensating for a current ripple of an inverter, according to an exemplary aspect of the presently disclosed embodiment.

As shown in FIG. 9, it is found that a 60 Hz-ripple component is removed in a DC C1 and an offset is removed in an output current C2.

Figure 10:
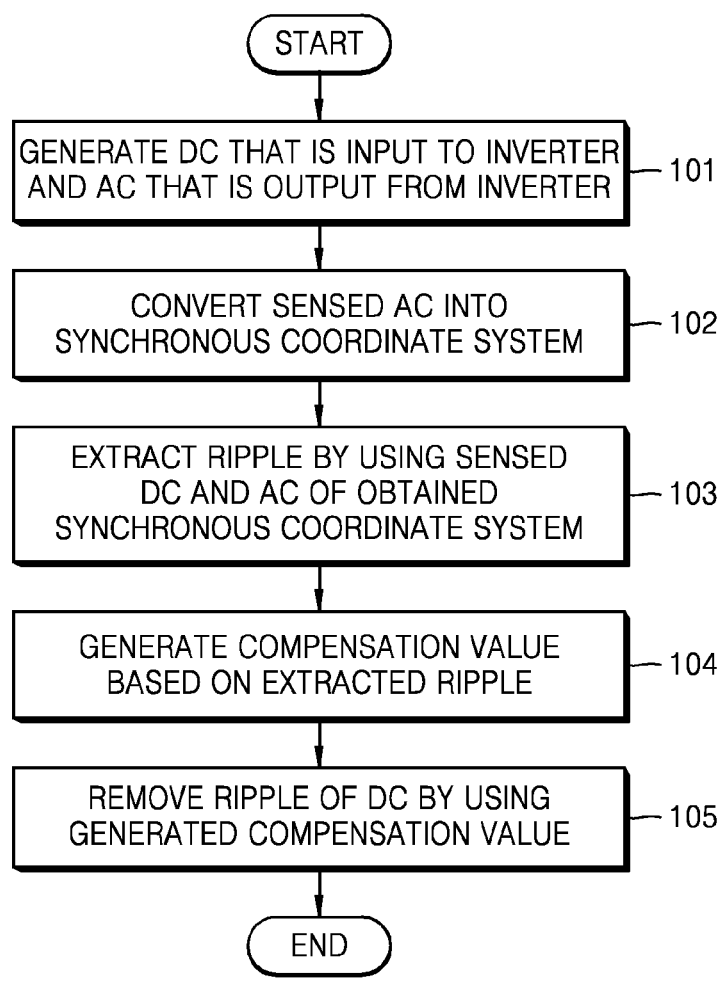
FIG. 10 is a flowchart of a method of compensating for a current ripple of an inverter, according to an exemplary aspect of the presently disclosed embodiment.

FIG. 10 is a flowchart of a method of compensating for a current ripple of an inverter, according to an exemplary aspect of the presently disclosed embodiment.

First, in operation 101, the current sensor 31 senses a DC that is input to the inverter and an AC that is output from the inverter.

Next, in operation 102, the coordinate converter 32 converts the AC that is sensed by the current sensor 31 into a synchronous coordinate system.

Next, in operation 103, the ripple extractor 33 extracts a ripple by using an AC of the synchronous coordinate system obtained by the coordinate converter 32 and the DC that is sensed by the current sensor 31.

Next, in operation 104, the compensation value generator 34 generates a compensation value based on the ripple that is extracted by the ripple extractor 33.

Next, in operation 105, the ripple compensator 35 removes a ripple that is included in the DC by using the compensation value that is generated by the compensation value generator 34.

A waveform of the AC that is output from the inverter may be prevented from being distorted by using the method.

2. Method that Removes Ripple Component that is Included in Reference Voltage

Figure 11:
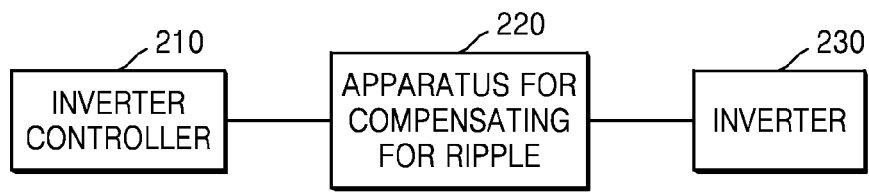
FIG. 11 is a diagram illustrating a configuration of an inverter control system to which the presently disclosed embodiment is applied.

FIG. 11 is a diagram illustrating a configuration of an inverter control system to which the presently disclosed embodiment is applied.

As shown in FIG. 11, the inverter control system to which the presently disclosed embodiment is applied includes an inverter controller 210, an apparatus 220 for compensating for a ripple, and an inverter 230.

First, the inverter controller 210 outputs a reference voltage for controlling the inverter 230. In this case, since the reference voltage for controlling the inverter 230 includes a frequency component (for example, 60 Hz corresponding to an output frequency), waveforms of an AC that is output from the inverter 230 and a DC that is input to the inverter 230 are distorted.

In order to prevent this problem, the apparatus 220 according to the presently disclosed embodiment removes a ripple component that is included in the reference voltage that is input from the inverter controller 210 to the inverter 230.

That is, the apparatus 220 extracts a ripple $V_{offset}$ by allowing the reference voltage that is input from the inverter controller 210 to the inverter 230 to sequentially pass through a BSF and a BPF, removes the extracted ripple in the reference voltage, converts a result into a stationary coordinate system, and outputs the stationary coordinate system. In this case, the BSF removes a twice component of an output frequency (generally 60 Hz) in the reference voltage, and the BPF extracts a ripple corresponding to the output frequency from the reference voltage that passes through the BSF.

Figure 12:
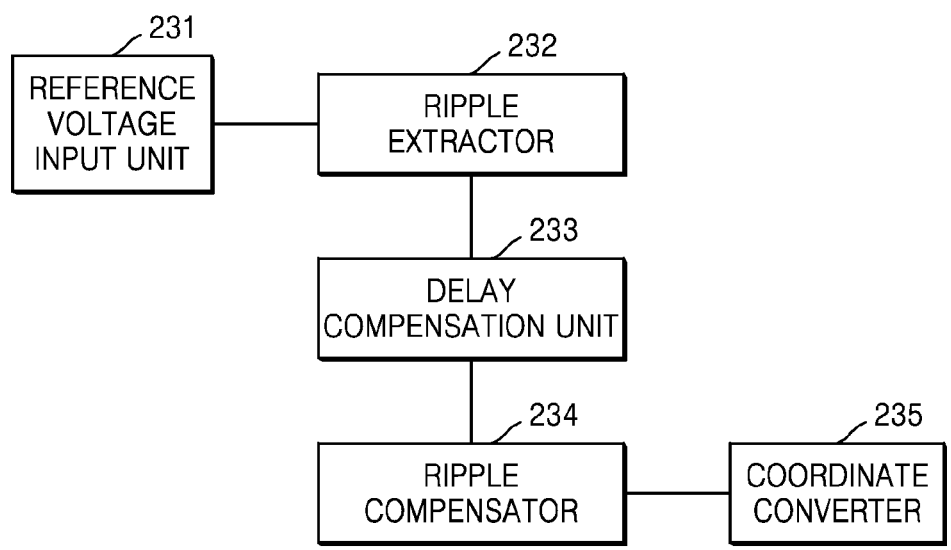
FIG. 12 is a diagram illustrating a configuration of an apparatus for compensating for a voltage ripple of an inverter, according to an exemplary aspect of the presently disclosed embodiment.

FIG. 12 is a diagram illustrating a configuration of an apparatus for compensating for a voltage ripple of an inverter, according to an exemplary aspect of the presently disclosed embodiment.

As shown in FIG. 12, the apparatus according to the presently disclosed embodiment includes a reference voltage input unit 231, a ripple extractor 232, a delay compensation unit 233, a ripple compensator 234, and a coordinate converter 235.

Each of the elements will now be explained. First, the reference voltage input unit 231 receives a reference voltage for controlling the inverter 230 that is output from the inverter controller 210.

Next, the ripple extractor 232 removes a twice component of an output frequency in the reference voltage that is received by the reference voltage input unit 231, and then extracts a ripple corresponding to the output frequency.

Next, the delay compensation unit 233 that is a module for performing phase synchronization during ripple compensation compensates for a time delay that occurs due to the ripple extractor 232.

Next, the ripple compensator 234 compensates for a ripple of the reference voltage that is output from the inverter controller 210 based on the ripple whose time delay is compensated for by the delay compensation unit 233.

Next, the coordinate converter 235 converts the reference voltage whose ripple is compensated for by the ripple compensator 234 into a stationary coordinate system.

Figure 13:
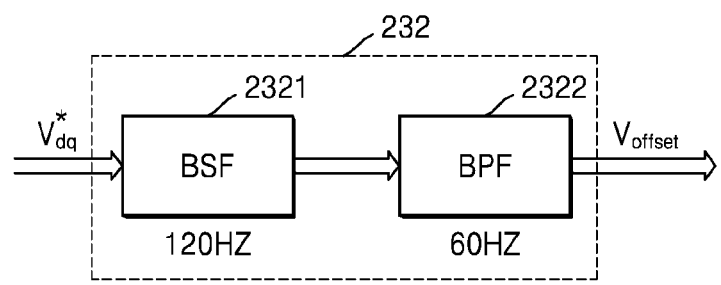
FIG. 13 is a detailed diagram illustrating a configuration of a ripple extractor, according to an exemplary aspect of the presently disclosed embodiment.

FIG. 13 is a detailed diagram illustrating a configuration of the ripple extractor 232, according to an exemplary aspect of the presently disclosed embodiment.

As shown in FIG. 13, the ripple extractor 232 according to the presently disclosed embodiment includes a BSF 2321 and a BPF 2322.

The BSF 2321 removes a twice component (120 Hz) of an output frequency (generally 60 Hz) in a reference voltage $v^*_{dq}$ that is output from the inverter controller 210.

The BPF 2322 extracts a ripple $V_{offset}$ corresponding to the output frequency from the reference voltage in which the twice component of the output frequency is removed by the BSF 2321.

Figure 14:
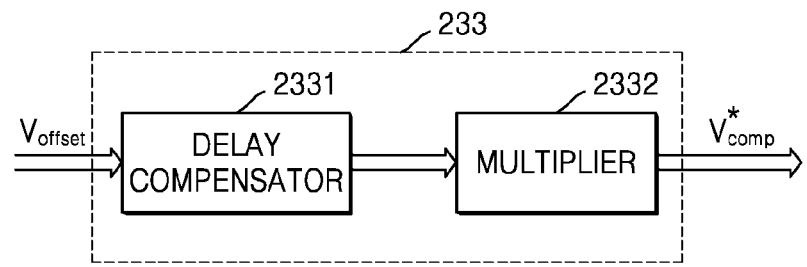
FIG. 14 is a detailed diagram illustrating a configuration of a delay compensation unit, according to an exemplary aspect of the presently disclosed embodiment.

FIG. 14 is a detailed diagram illustrating a configuration of the delay compensation unit 233, according to an exemplary aspect of the presently disclosed embodiment.

As shown in FIG. 14, the delay compensation unit 233 according to the presently disclosed embodiment includes a delay compensator 2331 and a multiplier 2332.

The delay compensator 2331 compensates for a time delay that occurs due to the ripple extractor 232. That is, the delay compensator 2331 performs phase synchronization for ripple compensation.

The multiplier 2332 outputs a final ripple $v^*_{comp}$ by multiplying the ripple whose time delay is compensated for by the delay compensator 2331 by a compensation value (that is a constant).

Figure 15:
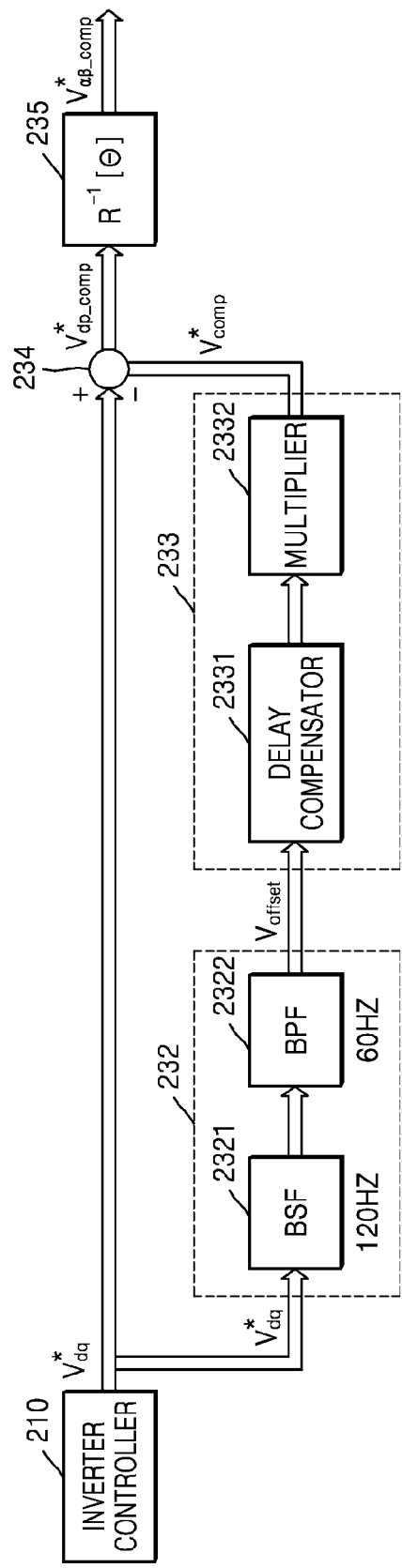
FIG. 15 is a detailed diagram illustrating a configuration of an apparatus for compensating for a voltage ripple of an inverter, according to an exemplary aspect of the presently disclosed embodiment.

FIG. 15 is a detailed diagram illustrating a configuration of an apparatus for compensating for a voltage ripple of an inverter, according to an exemplary aspect of the presently disclosed embodiment.

As shown in FIG. 15, the reference voltage $v^*_{dq}$ that is output from the inverter controller 210 is input to the ripple compensator 234 and the ripple extractor 232, and the ripple $V_{offset}$ that is extracted by the ripple extractor 232 passes through the delay compensation unit 233 and is input as the final ripple $v^*_{comp}$ to the ripple compensator 234 to be used to compensate for the reference voltage. That is, the ripple compensator 234 compensates a ripple of the reference voltage by subtracting the final ripple obtained by the multiplier 2332 by multiplying the compensation value from the reference voltage that is input to the inverter to obtain a reference voltage $v^*_{dq\_comp}$ whose ripple is compensated for.

The reference voltage $v^*_{dq\_comp}$ whose ripple is compensated for is converted into a stationary coordinate system by the coordinate converter 235 and is input as $v^*_{\alpha\beta\_comp}$ to the inverter 230.

Figure 17:
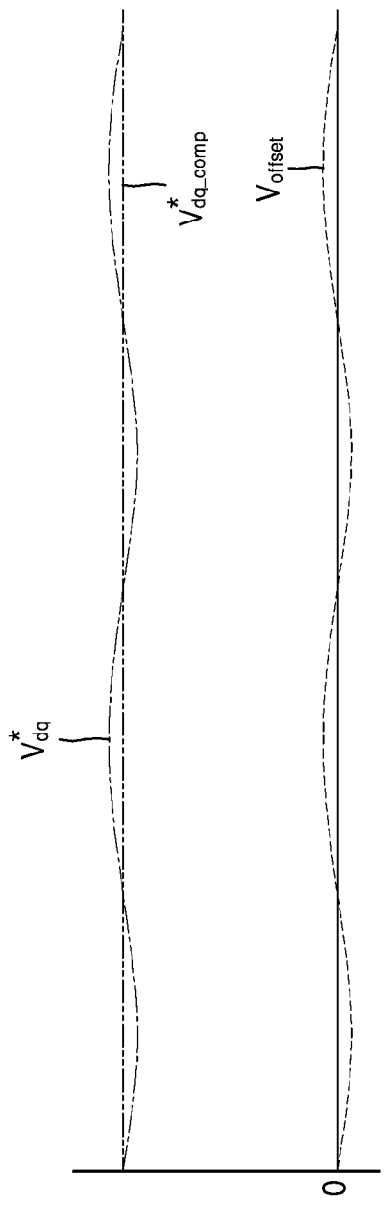
FIG. 17 is a diagram for explaining a process of compensating for a voltage ripple of an inverter, according to an exemplary aspect of the presently disclosed embodiment.

The reference voltage $v^*_{dq}$, the ripple $V_{offset}$, and the reference voltage $v^*_{dq\_comp}$ whose ripple is compensated for are exemplarily shown in FIG. 17.

Figure 16:
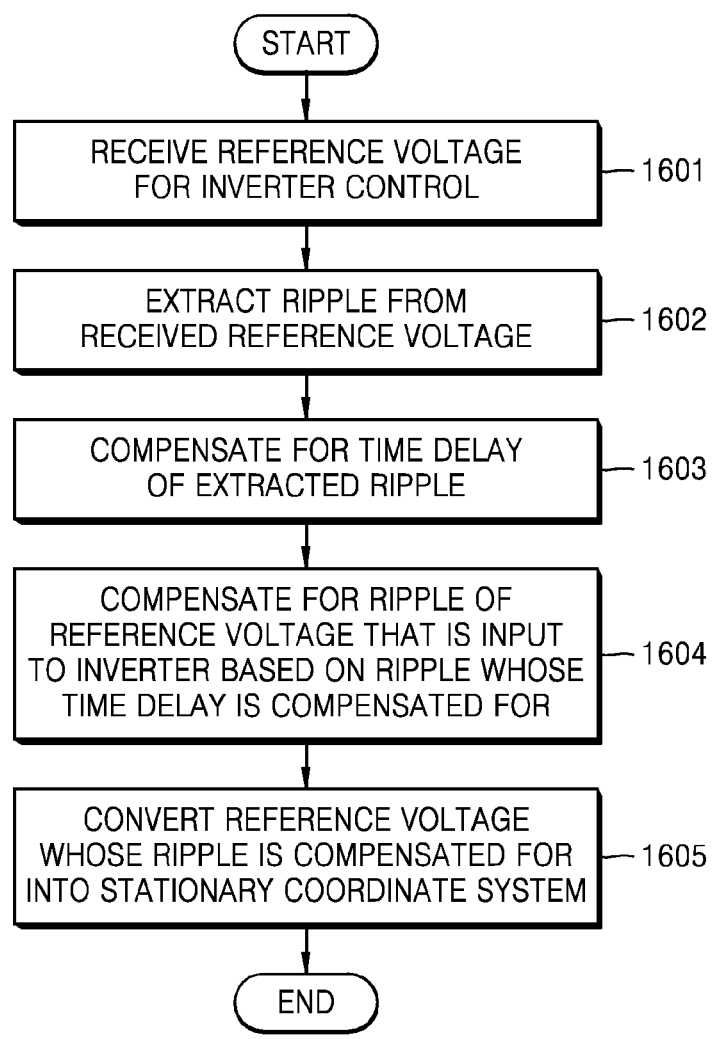
FIG. 16 is a flowchart of a method of compensating for a voltage ripple of an inverter, according to an exemplary aspect of the presently disclosed embodiment.

FIG. 16 is a flowchart of a method of compensating for a voltage ripple of an inverter, according to an exemplary aspect of the presently disclosed embodiment.

First, in operation 1601, the reference voltage input unit 231 receives a reference voltage for inverter control.

Next, in operation 1602, the ripple extractor 232 extracts a ripple from the reference voltage that is received by the reference voltage input unit 231.

Next, in operation 1603, the delay compensation unit 233 compensates for a time delay that occurs due to the ripple extractor 232. That is, the delay compensation unit 233 compensates for a time delay of the extracted ripple.

Next, in operation 1604, the ripple compensator 234 compensates for a ripple of the reference voltage that is input to the inverter, based on the ripple whose time delay is compensated for by the delay compensation unit 233.

Next, in operation 1605, the coordinate converter 235 converts the reference voltage whose ripple is compensated for by the ripple compensator 234 into a stationary coordinate system.

Waveforms of an AC that is output from the inverter and a DC that is input to the inverter may be prevented from being distorted by using the method.

Figure 18:
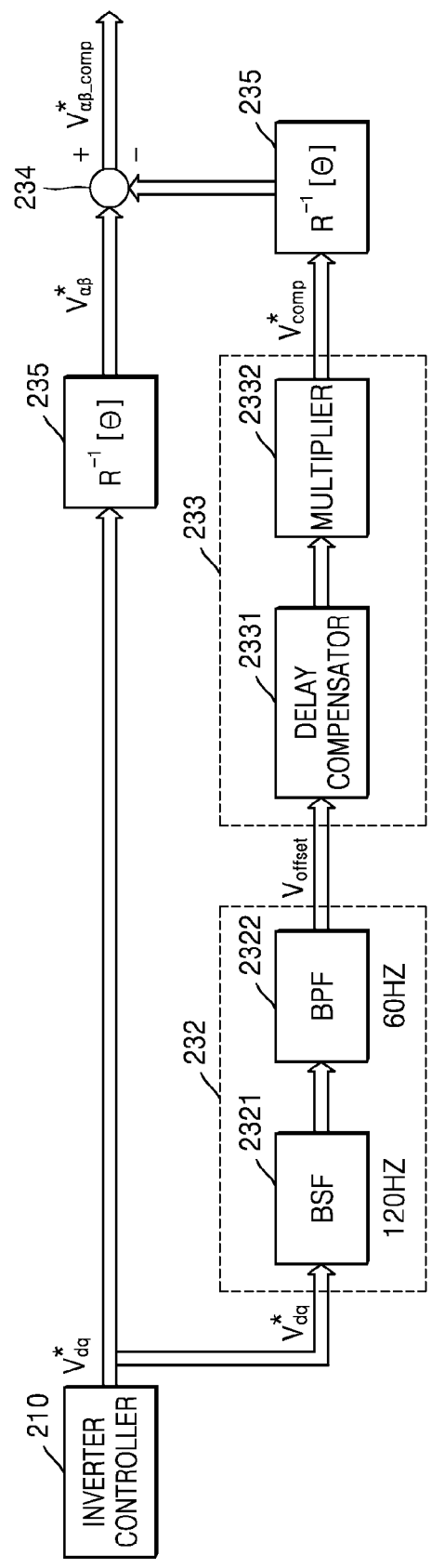
FIG. 18 is a detailed diagram illustrating a configuration of an apparatus for compensating for a voltage ripple of an inverter, according to another exemplary aspect of the presently disclosed embodiment.

Although a process of performing compensation on a synchronous coordinate system has been explained in the above exemplary aspect, compensation may be performed on a stationary coordinate system as shown in FIG. 18.

Figure 19:
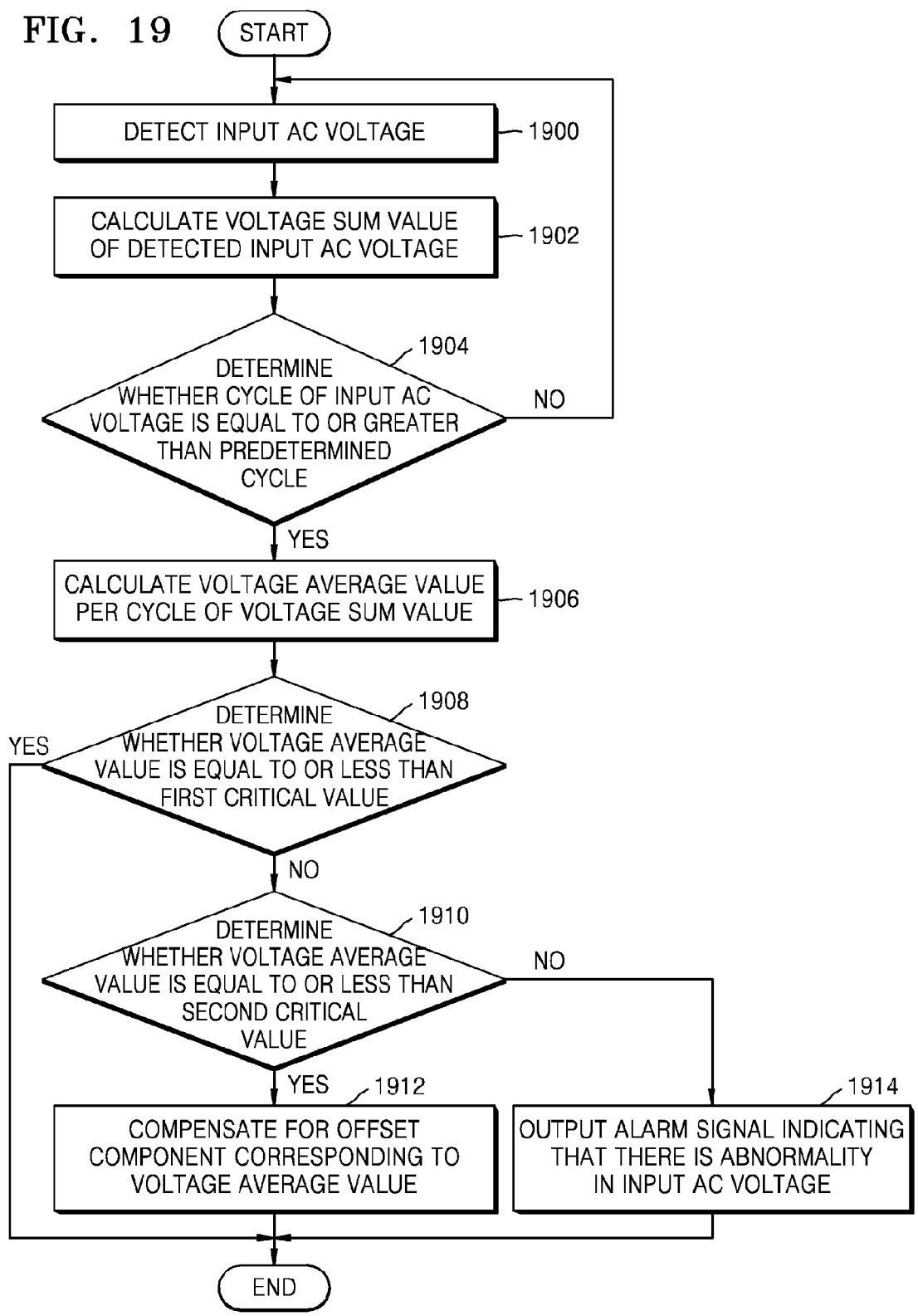
FIG. 19 is a flowchart of a method of compensating for an offset of a signal for inverter control, according to an exemplary aspect of the presently disclosed embodiment.

3. Method that Reduces Ripple Component Corresponding to Output Frequency of Inverter by Compensating for Offset Component of AC Voltage/AC that is Used for Inverter Control FIG. 19 is a flowchart of a method of compensating for an offset of a signal for inverter control, according to an exemplary aspect of the presently disclosed embodiment.

In operation 1900, an input AC voltage for controlling an inverter is sampled and detected at each predetermined time interval.

Figure 20:
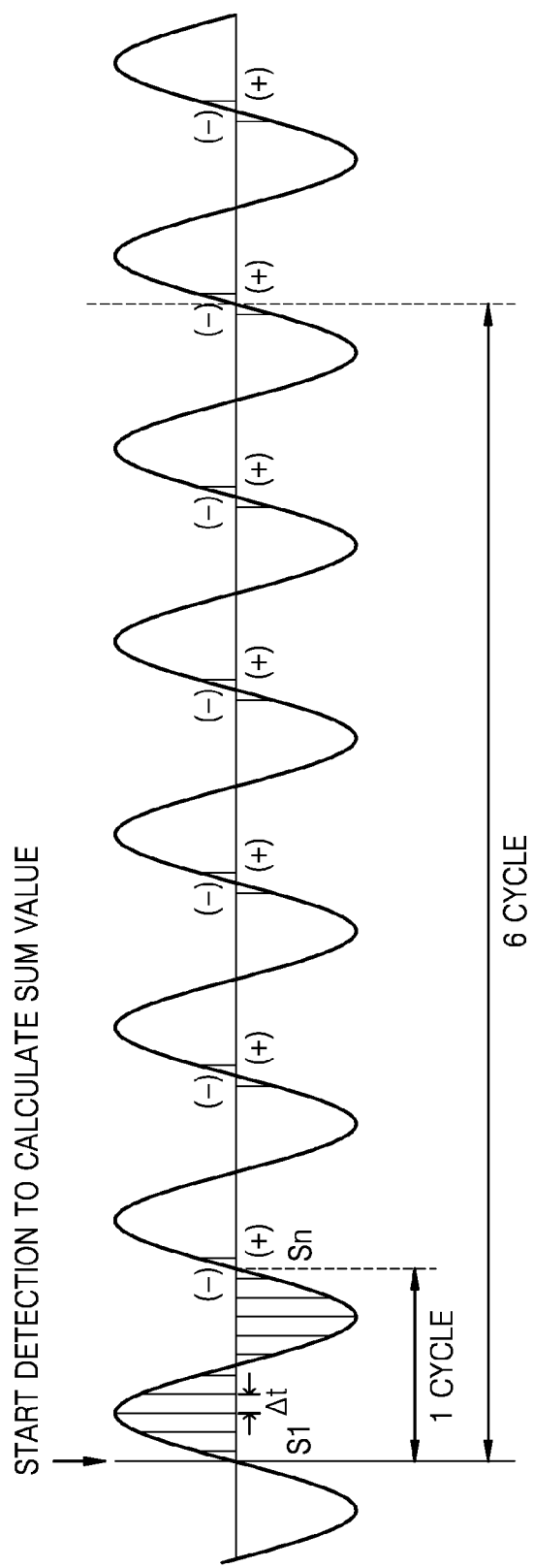
FIG. 20 is a diagram illustrating a waveform of an input alternating current (AC) voltage that is applied to an inverter, according to an exemplary aspect of the presently disclosed embodiment.

FIG. 20 is a diagram illustrating a waveform of an input AC voltage that is applied to an inverter, according to an exemplary aspect of the presently disclosed embodiment. As shown in FIG. 20, it is assumed that the input AC voltage is sampled at each predetermined time interval $\Delta t$. When one cycle is divided by the predetermined time interval $\Delta t$, n samples $S_1$ through $S_n$ are obtained and the input AC voltage of each of the n samples $S_1$ through $S_n$ is detected. For example, when one cycle corresponds to 16.666 msec and is sampled at each 125 usec, about 133 samples may be obtained and the input AC voltage of each of the 133 samples is detected. As the number of samples increases, a detection signal value of the input AC voltage becomes more precise.

In operation 1902 after operation 1900, a voltage sum value of the input AC voltage that is detected at each predetermined time interval is calculated. For example, as shown in FIG. 20, voltage values of the detected n samples $S_1$ through $S_n$ are all added. When the voltage sum value in each cycle is calculated, the voltage sum value of the input AC voltage has to be desirably "0". However, actually, an offset component is added to the input AC voltage, and due to the offset component, the voltage sum value has a positive (+) value or a negative (−) value, instead of "0".

In operation 1904 after operation 1902, it is determined whether a cycle of the input AC voltage is equal to or greater than a predetermined cycle. The predetermined cycle that is a cycle for determining whether to compensate for an offset component may be arbitrarily determined. The predetermined cycle may be 1 cycle or 6 cycles as shown in FIG. 20. Since more samples of an input voltage may be obtained as a figure in the predetermined cycle increases, more precise offset compensation may be performed. For example, as shown in FIG. 20, when the predetermined cycle is 1 cycle, whether an offset is compensated for may be determined by using only an input voltage value that is sampled in the 1 cycle whereas when the predetermined cycle is 6 cycles, the number of sampled input voltages is increased and thus the precision of offset compensation is improved.

In order to determine whether a cycle of the input AC voltage is equal to or greater than the predetermined cycle, the cycle of the input AC voltage is determined by counting the number of times a magnitude of the input AC voltage changes from a negative (−) value to a positive (+) value. That is, as shown in FIG. 20, a cycle of the input AC voltage may be calculated by counting the number of times a detected voltage value changes from a negative (−) value to a positive (+) value. It is determined whether the calculated cycle of the input AC voltage is equal to or greater than the predetermined cycle that is preset. For example, when it is assumed that the predetermined cycle that is preset is 6 cycles, the number of times a voltage value of the input AC voltage changes from a negative (−) value to a positive (+) value is counted and it is determined whether the number of counting processes is equal to or greater than 6.

In order to determine whether the cycle of the input AC voltage is equal to or greater than the predetermined cycle, the cycle of the input AC voltage may be determined by counting the number of times a magnitude of the input AC voltage changes from a positive (+) value to a negative (−) value.

If the cycle of the input AC voltage is less than the predetermined cycle, the method returns to operation 1900 and a process of detecting the input AC voltage and a sum value of the detected input AC voltage is repeatedly performed.

In operation 1906 after operation 1904, when the cycle of the input AC voltage is equal to or greater than the predetermined cycle, a voltage average value per cycle of the voltage sum value is calculated. For example, when it is determined that the predetermined cycle is set to 6 cycles and the cycle of the input AC voltage is equal to or greater than 6 cycles, a voltage average value per cycle is calculated by dividing a sum value of sampled detected voltages of the input AC voltage during 6 cycles by 6. As described above, although the sum value of the input AC voltage has to be desirably "0", actually, the voltage sum value has a positive (+) value or a negative (−) value, instead of "0" due to an offset component of the input AC voltage, and thus the voltage average value also has a positive (+) value or a negative (−) value corresponding to the offset component, instead of "0".

In operation 1908 after operation 1906, it is determined whether the calculated voltage average value exceeds a first critical value. The first critical value that is a preset value corresponds to a voltage reference value for determining whether the offset component is to be compensated for. When the calculated voltage average value does not exceed the first critical value, it is determined that separate offset compensation is not necessary. Accordingly, as shown in FIG. 19, when the calculated voltage average value does not exceed the first critical value, the method ends.

However, in operation 1908, when the voltage average value exceeds the first critical value, the method proceeds to operation 1910. In operation 1910, it is determined whether the voltage average value exceeds a second critical value. The second critical value that is a preset value corresponds to a voltage reference value for determining whether an alarm signal indicating that there is abnormality in the input AC voltage is to be output, independent of offset compensation. The second critical value is set to a value that is at least equal to or greater than a first reference value. When the voltage average value does not exceed the second critical value, it is determined that the alarm signal does not need to be output, and the method proceeds to operation 1912. In operation 1912, the offset component is compensated for.

In operation 1910, when the voltage average value exceeds the first critical value and does not exceed the second critical value, the method proceeds to operation 1912. In operation 1912, an offset component corresponding to the calculated voltage average value is compensated for. When the voltage average value corresponds a value between the first critical value and the second critical value, the input AC voltage is compensated for to be reduced by the offset component corresponding to the voltage average value. That is, when the voltage average value is a positive (+) value, a voltage obtained by subtracting an absolute value of the voltage average value from a magnitude of the input AC voltage that is next applied is applied. Also, when the voltage average value is a negative (−) value, a voltage obtained by adding the absolute value of the voltage average value to the magnitude of the input AC voltage that is next applied is applied.

In operation 1910, when the calculated voltage average value exceeds the second critical value, the method proceeds to operation 1914. In operation 1914, an alarm signal indicating that there is abnormality in the input AC voltage is output. When the voltage average value exceeds the second critical value, it means that the input AC voltage exceeds an appropriate range of input power for controlling the inverter. In this case, an alarm signal is output in order to notify an operator that there is abnormality in the input AC voltage that is input to the inverter. The alarm signal may be output as a warning sound, or may be displayed or transmitted as a warning message.

Figure 21:
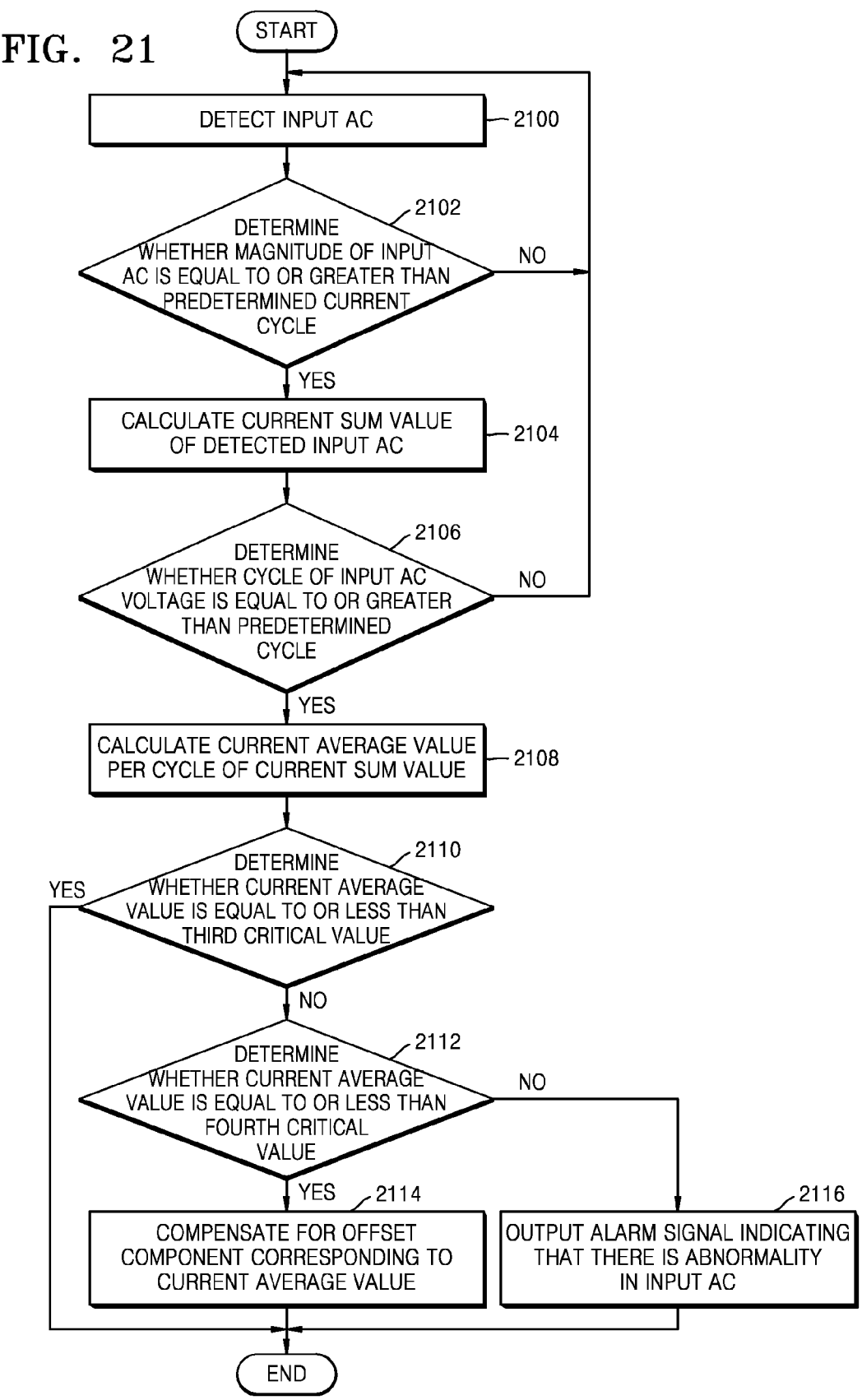
FIG. 21 is a flowchart of a method of compensating for an offset of a signal for inverter control, according to another exemplary aspect of the presently disclosed embodiment.

FIG. 21 is a flowchart of a method of compensating for an offset of a signal for inverter control, according to another exemplary aspect of the presently disclosed embodiment.

In operation 2100, an input AC for controlling an inverter is sampled and detected every predetermined time interval. Although FIG. 20 illustrates a waveform of an input AC voltage that is applied to the inverter, when it is assumed that the waveform is a waveform of the input AC, the input AC is sampled at each predetermined time interval Δt and the input AC voltage of each of the sampled n currents is detected.

In operation 2102 after operation 2100, it is determined whether a magnitude of the detected input AC is equal to or greater than a predetermined current value. Since a magnitude of the input AC that is first applied is very small, the small input AC is not appropriate as a detection signal for offset compensation. The predetermined current value corresponds to a reference value for determining whether the input AC that is greater by a predetermined value or more than the input AC that is first applied is used as a detection signal for offset compensation. If the magnitude of the input AC is less than the predetermined current value, a process of detecting the input AC is repeatedly performed.

In operation 2102, when the magnitude of the input AC is equal to or greater than the predetermined current value, the method proceeds to operation 2104. In operation 2104, a current sum value of the input AC that is detected at each predetermined time interval is calculated. For example, when it is assumed that the waveform of the input AC voltage of FIG. 20 is a waveform of the input AC, current values of the detected n samples $S_1$ through $S_n$ are all added. Like the voltage sum value, the current sum value of the input AC has to be desirably "0". However, actually, an offset component is added to the input AC and due to the offset component, the current sum value has a positive (+) value or a negative (−) value, instead of "0".

In operation 2106 after operation 2104, it is determined whether a cycle of the input AC is equal to or greater than a predetermined cycle. The predetermined cycle is a cycle for determining whether to compensate for an offset component. Since more samples of an input current may be obtained as a figure in the predetermined cycle increases, more precise offset compensation may be performed.

In order to determine whether a cycle of the input AC is equal to or greater than the predetermined cycle, the cycle of the input AC is determined by counting the number of times a magnitude of the input AC changes from a negative (−) value to a positive (+) value. Referring to FIG. 20, the cycle of the input AC may be calculated by counting the number of times a detected current value changes from a negative (−) value to a positive (+) value. It is determined whether the calculated cycle of the input AC is equal to or greater than the predetermined cycle that is preset.

In order to determine whether the cycle of the input AC is equal to or greater than the predetermined cycle, the cycle of the input AC may be determined by counting the number of times a magnitude of the input AC changes from a positive (+) value to a negative (−) value.

If the cycle of the input AC is less than the predetermined cycle, the method returns to operation 2100 and a process of detecting the input AC and calculating a sum value of the detected input AC is repeatedly performed.

In operation 2108 after operation 2106, when the cycle of the input AC is equal to or greater than the predetermined cycle, a current average value per cycle of the current sum value is calculated. For example, when it is determined that the predetermined cycle is set to 6 cycles and the cycle of the input AC is equal to or greater than 6 cycles, the current average value per cycle is calculated by dividing a sum value of sampled detected currents of the input AC during 6 cycles by 6. As described above, although the current sum value of the input AC has to be desirably "0", actually, the current sum value has a positive (+) value or a negative (−) value, instead of "0", due to an offset component of the input AC, and thus the current average value also has a positive (+) value or a negative (−) value corresponding to the offset component, instead of "0".

In operation 2110 after operation 2108, it is determined whether the calculated current average value exceeds a third critical value. The third critical value that is a preset value corresponds to a current reference value for determining whether the offset component is to be compensated for. When the calculated current average value does not exceed the third critical value, it is determined that separate offset compensation is not necessary. Accordingly, as shown in FIG. 21, when the calculated current average value does not exceed the third critical value, the method ends.

However, in operation 2110, when the current average value exceeds the third critical value, the method proceeds to operation 2112. In operation 2112, it is determined whether the current average value exceeds a fourth critical value. The fourth critical value that is a preset value corresponds to a current reference value for determining whether an alarm signal indicating whether there is abnormality in the input AC is to be output, independent of offset compensation. The fourth critical value is set to a value that is at least equal to or greater than a third reference value. When the current average value does not exceed the fourth critical value, it is determined that the alarm signal does not need to be output and the method proceeds to operation 2114 in which the offset component is compensated for.

In operation 2112, when the current average value exceeds the third critical value and does not exceed the fourth critical value, the method proceeds to operation 2114. In operation 2114, an offset component corresponding to the calculated current average value is compensated for. When the current average value corresponds a value between the third critical value and the fourth critical value, the input AC is compensated for to be reduced by the offset component corresponding to the current average value. That is, when the current average is a positive (+) value, a current obtained by subtracting an absolute value of the current average value from a magnitude of the input AC that is next applied is applied. Also, when the current average value is a negative (−) value, a current obtained by adding the absolute value of the current average value to the magnitude of the input AC that is next applied is applied.

In operation 2112, when the calculated current average value exceeds the fourth critical value, the method proceeds to operation 2116. In operation 2116, an alarm signal indicating that there is abnormality in the input AC is output. When the current average value exceeds the fourth critical value, it means that the input AC exceeds an appropriate range of input power for controlling the inverter. In this case, an alarm signal is output in order to notify an operator that there is abnormality in the input AC that is input to the inverter. The alarm signal may be output as a warning sound, or may be displayed or transmitted as a warning message.

An apparatus for compensating for an offset of a signal for inverter control according to the presently disclosed embodiment will now be explained with the appended drawings.

Figure 22:
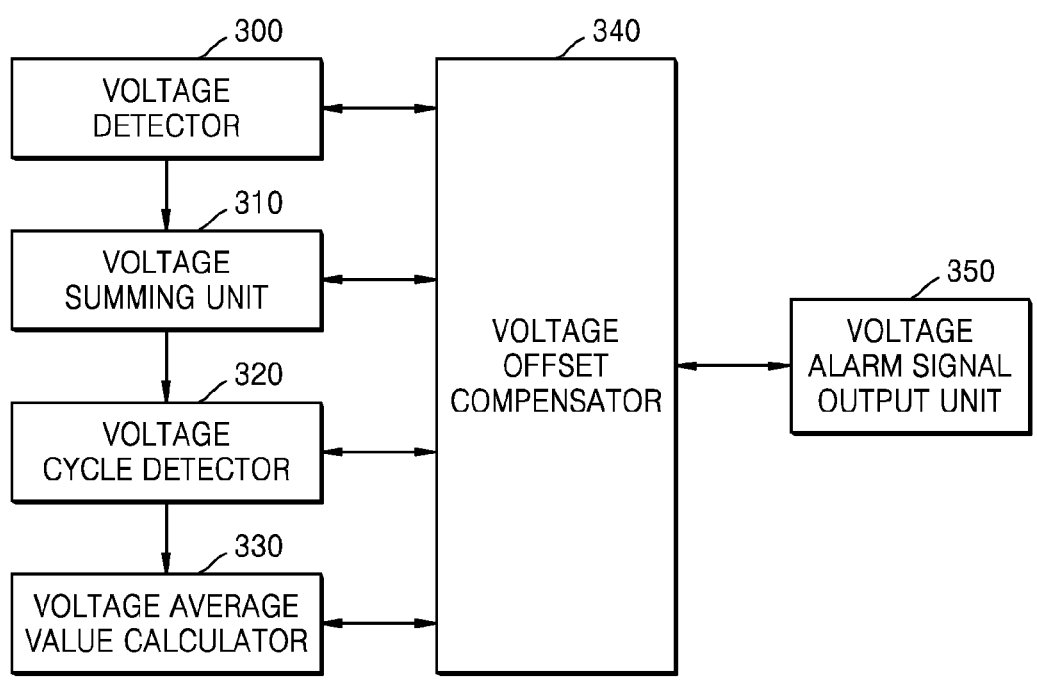
FIG. 22 is a block diagram illustrating an apparatus for compensating for an offset of a signal for inverter control, according to an exemplary aspect of the presently disclosed embodiment.

FIG. 22 is a block diagram illustrating an apparatus for compensating for an offset of a signal for inverter control, according to an exemplary aspect of the presently disclosed embodiment. The apparatus includes a voltage detector 300, a voltage summing unit 310, a voltage cycle detector 320, a voltage average value calculator 330, a voltage offset compensator 340, and a voltage alarm signal output unit 350.

The voltage detector 300 samples and detects an input AC voltage for controlling an inverter at each predetermined time interval. As shown in FIG. 20, the voltage detector 300 samples the input AC voltage at each predetermined time interval Δt, and detects an input AC voltage of each of the obtained n samples $S_1$ through $S_n$.

The voltage summing unit 310 calculates a voltage sum value of the input AC voltage that is detected at each predetermined time interval. As shown in FIG. 20, when it is assumed that the voltage sum value is calculated during 1 cycle, the voltage summing unit 310 adds all of voltage values of the n samples $S_1$ through $S_n$ that are sampled during 1 cycle.

The voltage cycle detector 320 determines whether a cycle of the input AC voltage is equal to or greater than a predetermined cycle. The predetermined cycle is a cycle for determining whether to compensate for an offset component. The voltage cycle detector 320 previously stores information about a set value of the predetermined cycle. Since more samples of an input voltage may be obtained as a figure in the predetermined cycle increases, more precise offset compensation may be performed.

In order to determine whether the cycle of the input AC voltage is equal to or greater than the predetermined cycle, the voltage cycle detector 320 determines the cycle of the input AC voltage by counting the number of times a magnitude of the input AC voltage changes from a negative value to a positive value. As shown in FIG. 20, the voltage cycle detector 320 counts the number of times a detected voltage value changes from a negative (−) value to a positive (+) value and determines whether the calculated cycle of the counted input AC voltage is equal to or greater than the predetermined cycle that is preset. In order to determine whether the cycle of the input AC voltage is equal to or greater than the predetermined cycle, the voltage cycle detector 320 may determine the cycle of the input AC voltage by counting the number of times a magnitude of the input AC voltage changes from a positive (+) value to a negative (−) value.

When the cycle of the input AC voltage is equal to or greater than the predetermined cycle, the voltage average value calculator 330 calculates a voltage average value per cycle of the voltage sum value. For example, when the predetermined cycle is set to 6 cycles, the voltage average value calculator 330 calculates a voltage average value per cycle by dividing a sum value of sampled detected voltages of the input AC voltage during 6 cycles by 6.

The voltage offset compensator 340 determines whether the calculated voltage average value exceeds a first critical value and a second critical value, and compensates for an offset component corresponding to the voltage average value or outputs an alarm signal indicating that there is abnormality in the input AC voltage according to whether the voltage average value exceeds the first critical value or the second critical value. The first critical value that is a preset value corresponds to a voltage reference value for determining whether an offset component is to be compensated for. When the calculated voltage average value does not exceed the first critical value, the voltage offset compensator 340 determines that separate offset compensation is not necessary.

When the voltage average value exceeds the first critical value, the voltage offset compensator 340 determines whether the voltage average value exceeds the second critical value. The second critical value that is a preset value corresponds to a voltage reference value for determining whether an alarm signal indicating that there is abnormality in the input AC voltage is to be output. The second critical value is set to a value that is at least equal to or greater than a first reference value. When the voltage average value does not exceed the second critical value, the voltage offset compensator 340 compensates for an offset component corresponding to the calculated voltage average value. The voltage offset compensator 340 compensates for the input AC voltage to be reduced by the offset component corresponding to the voltage average value.

When the calculated voltage average value exceeds the second critical value, the voltage offset compensator 340 controls the voltage alarm signal output unit 350 to output an alarm signal indicating that there is abnormality in the input AC voltage. When the voltage average value exceeds the second critical value, it means that the input AC voltage exceeds an appropriate range of input power for controlling the inverter. In this case, the voltage offset compensator 340 controls the voltage alarm signal output unit 350 to output an alarm signal in order to notify an operator that there is abnormality in the input AC voltage that is input to the inverter.

Accordingly, the voltage alarm signal output unit 350 outputs an alarm signal indicating that there is abnormality in the input AC voltage. The voltage alarm signal output unit 350 may output the alarm signal as a warning sound or may display or transmit the alarm signal as a warning message to the operator through a network.

Figure 23:
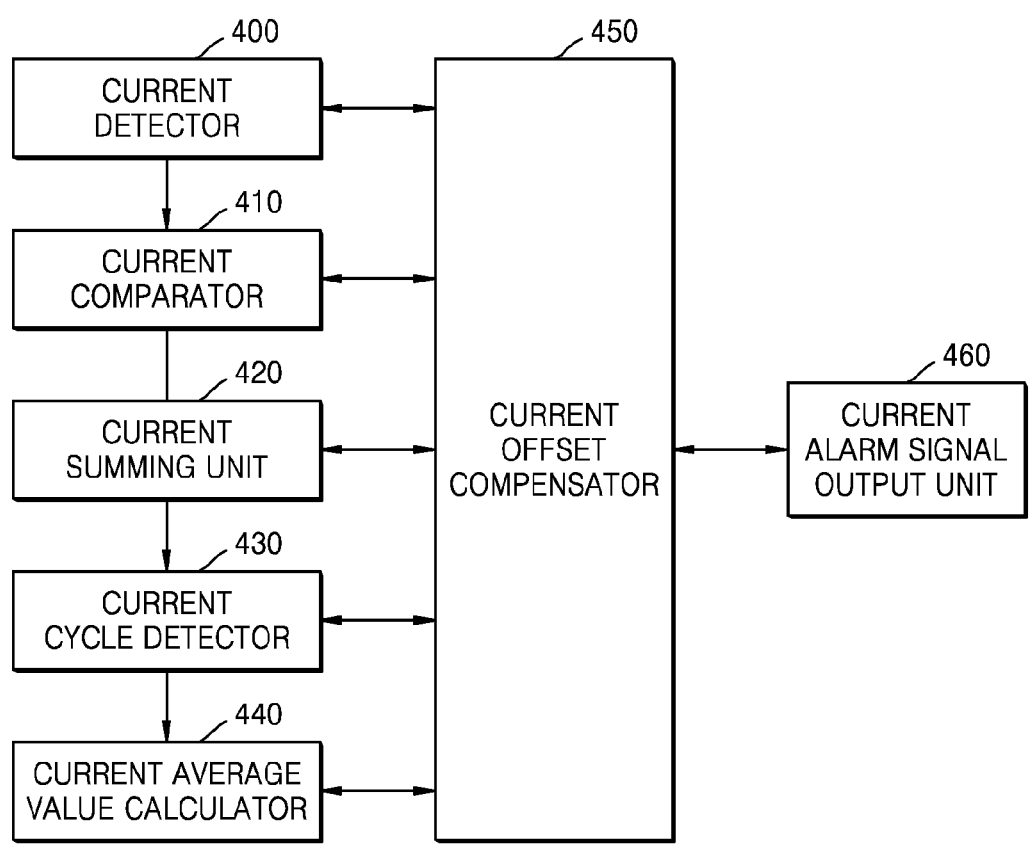
FIG. 23 is a block diagram illustrating an apparatus for compensating for an offset of a signal for inverter control, according to another exemplary aspect of the presently disclosed embodiment.

FIG. 23 is a block diagram illustrating an apparatus for compensating for an offset of a signal for inverter control, according to another exemplary aspect of the presently disclosed embodiment. The apparatus includes a current detector 400, a current comparator 410, a current summing unit 420, a current cycle detector 430, a current average value calculator 440, a current offset compensator 450, and a current alarm signal output unit 460.

The current detector 400 samples and detects an input AC for controlling an inverter at each predetermined time interval. Referring to FIG. 20, the current detector 400 samples the input AC at each predetermined time interval Δt, and detects the input AC of each of the obtained n samples $S_1$ through $S_n$.

The current comparator 410 determines whether a magnitude of the input AC is equal to or greater than a predetermined current value. Since a magnitude of the input AC that that is first applied is very small, the input AC that is first applied is not appropriate as a detection signal for offset compensation. The predetermined current value corresponds to a reference value for determining whether the input AC that is greater by a predetermined value or more than the input AC that is first applied is used as a detection signal for offset compensation.

When the magnitude of the input AC is equal to or greater than the predetermined current value, the current summing unit 420 calculates a current sum value of the input AC that is detected at each predetermined time interval. When it is assumed that the current sum value is calculated during 1 cycle with reference to FIG. 20, the current summing unit 420 adds all of current values of the n samples that are sampled during 1 cycle.

The current cycle detector 430 determines whether a cycle of the input AC is equal to or greater than a predetermined cycle. The predetermined cycle is a cycle for determining whether to compensate for an offset component. The current cycle detector 430 previously stores information about a set value of the predetermined cycle. Since more samples of an input current may be obtained as a figure in the predetermined cycle increases, more precise offset compensation may be performed.

In order to determine whether the cycle of the input AC is equal to or greater than the predetermined cycle, the current cycle detector 430 determines the cycle of the input AC by counting the number of times a magnitude of the input AC changes from a negative value to a positive value. Referring to FIG. 20, the current cycle detector 430 counts the number of times a detected current value changes from a negative (−) value to a positive (+) value and determines whether the calculated cycle of the input AC is equal to or greater than the predetermined cycle that is preset. In order to determine whether the cycle of the input AC is equal to or greater than the predetermined cycle, the current cycle detector 430 may determine the cycle of the input AC by counting the number of times a magnitude of the input AC changes from a positive (+) value to a negative (−) value.

When the cycle of the input AC is equal to or greater than the predetermined cycle, the current average value calculator 440 calculates a current average value per cycle of the current sum value. For example, when the predetermined cycle is set to 6 cycles, the current average value calculator 440 calculates a current average value per cycle by dividing a sum value of sampled detected currents of the input AC during 6 cycles by 6.

The current offset compensator 450 determines whether the calculated current average value exceeds a third critical value and a fourth critical value, and compensates for an offset component corresponding to the current average value or outputs alarm signal indicating that there is abnormality in the input AC according to whether the current average value exceeds the third critical value or the fourth critical value. The third critical value that is a preset value corresponds to a current reference value for determining whether an offset component is to be compensated for. When the calculated current average value does not exceed the third critical value, the current offset compensator 450 determines that separate offset compensation is not necessary.

When the current average value exceeds the third critical value, the current offset compensator 450 determines whether the current average value exceeds the fourth critical value. The fourth critical value that is a preset value corresponds to a current reference value for determining whether an alarm signal indicating that there is abnormality in the input AC is to be output. The fourth critical value is set to a value that is at least equal to or greater than a third reference value. When the current average value does not exceed the fourth critical value, the current offset compensator 450 compensates for an offset component corresponding to the calculated current average value. The current offset compensator 450 compensates for the input AC to be reduced by the offset component corresponding to the current average value.

When the calculated current average value exceeds the fourth critical value, the current offset compensator 450 controls the current alarm signal output unit 460 to output an alarm signal indicating that there is abnormality in the input AC. When the current average value exceeds the fourth critical value, it means that the input AC exceeds an appropriate range of input power for controlling the inverter. In this case, the current offset compensator 450 controls the current alarm signal output unit 460 to output an alarm signal in order to notify an operator that there is abnormality in the input AC.

Accordingly, the current alarm signal output unit 460 outputs an alarm signal indicating that there is abnormality in the input AC. The current alarm signal output unit 460 may output the alarm signal as a warning sound or may display or transmit the alarm signal as a warning message to the operator through a network.

The afore-described methods of the presently disclosed embodiment may be implemented as code/instructions/programs. For example, the afore-described methods of the presently disclosed embodiment may be executed by a general-purpose digital computer that runs the code/instructions/programs by using a computer-readable recording medium. Examples of the computer-readable recording medium include storage media such as magnetic storage media (e.g., read only memories (ROMs), floppy discs, or hard discs) and optically readable media (e.g., compact disk-read only memories (CD-ROMs), or digital versatile disks (DVDs)).

While the presently disclosed embodiment has been particularly shown and described with reference to exemplary aspects thereof, they are provided for the purposes of illustration and it will be understood by those of ordinary skill in the art that various modifications and equivalent other aspects can be made from the presently disclosed embodiment. Accordingly, the true technical scope of the presently disclosed embodiment is defined by the technical spirit of the appended claims.

What is claimed is:

1. An apparatus for compensating for a current ripple of an inverter, the apparatus comprising:
    a current sensor that senses a direct current (DC) that is input to the inverter and an alternating current (AC) that is output from the inverter;
    a coordinate converter that converts the AC that is sensed by the current sensor into a synchronous coordinate system;
    a ripple extractor that extracts a ripple by using the DC that is sensed by the current sensor and an AC of the synchronous coordinate system that is obtained by the coordinate converter;
    a compensation value generator that generates a compensation value based on the ripple that is extracted by the ripple extractor; and
    a ripple compensator that removes the ripple of the DC by using the compensation value that is generated by the compensation value generator.

2. The apparatus of claim 1, wherein when the inverter is a 3-phase inverter, the current sensor converts a 3-phase AC that is sensed by the current sensor into a 2-phase stationary coordinate system and converts the 2-phase stationary coordinate system into a synchronous coordinate system ($i_{oD}$, $I_{oQ}$).

3. The apparatus of claim 1, wherein when the inverter is a single phase-inverter, the coordinate converter converts a single-phase AC that is sensed by the current sensor and an AC obtained by shifting the single-phase AC by 90° into a synchronous coordinate system ($i_{oD}$, $I_{oQ}$).

4. The apparatus of claim 1, wherein the ripple extractor comprises:
    a first ripple extractor that extracts a first ripple from a DC $I_{DC}$ that is sensed by the current sensor, and converts the extracted first ripple and a ripple obtained by shifting the extracted first ripple by 90° into a synchronous coordinate system ($I_{DC\_signal\_q}$, $I_{DC\_signal\_d}$);
    a second ripple extractor that extracts a second ripple from the AC ($i_{oD}$) of the synchronous coordinate system, and converts the extracted second ripple and a ripple obtained by shifting the extracted second ripple by 90° into a synchronous coordinate system ($i_{oD\_signal\_q}$, $i_{oD\_signal\_d}$); and
    a third ripple extractor that extracts a third ripple from the AC ($I_{oQ}$) of the synchronous coordinate system, and converts the extracted third ripple and a ripple obtained by shifting the extracted third ripple by 90° into a synchronous coordinate system ($i_{oQ\_signal\_q}$, $i_{oQ\_signal\_d}$).

5. The apparatus of claim 4, wherein the first ripple extractor comprises:
- a first filter that removes a twice component of an output frequency in the DC that is sensed by the current sensor;
- a second filter that extracts a first ripple corresponding to the output frequency from a DC that passes through the first filter; and
- a third filter that shifts by 90° the first ripple that is extracted by the second filter; and
- a synchronous coordinate converter that converts the first ripple that is extracted by the second filter and a ripple obtained by the third filter by shifting the first ripple by 90° into a synchronous coordinate system.

6. The apparatus of claim 4, wherein the second ripple extractor comprises:
- a first filter that removes a twice component of an output frequency in the AC ($I_{oD}$) of the synchronous coordinate system that is obtained by the coordinate converter;
- a second filter that extracts a second ripple corresponding to the output frequency from an AC that passes through the first filter;
- a third filter that shifts by 90° the second ripple that is extracted by the second filter; and
- a synchronous coordinate converter that converts the second ripple that is extracted by the second filter and a ripple obtained by the third filter by shifting the second ripple by 90° into a synchronous coordinate system.

7. The apparatus of claim 4, wherein the third ripple extractor comprises:
- a first filter that removes a twice component of an output frequency in the AC ($I_{oQ}$) of the synchronous coordinate system that is obtained by the coordinate converter;
- a second filter that extracts a third ripple corresponding to the output frequency from an AC that passes through the first filter;
- a third filter that shifts by 90° the third ripple that is extracted by the second filter; and
- a coordinate converter that converts the third ripple that is extracted by the second filter and a ripple obtained by the third filter by shifting the third ripple by 90° into a synchronous coordinate system.

8. The apparatus of claim 4, wherein the compensation value generator comprises:
- a first generator that generates a first axis voltage in a stationary coordinate system based on a first axis ripple $I_{DC\_signal\_d}$ of the synchronous coordinate system for the DC that is extracted by the first ripple extractor 51 and a first axis ripple $i_{oD\_signal\_d}$ of the synchronous coordinate system for the AC ($i_{oD}$) that is extracted by the second ripple extractor; and
- a second generator that generates a second axis voltage in the stationary coordinate system based on a second axis ripple $i_{oD\_signal\_d}$ of the synchronous coordinate system for the DC that is extracted by the first ripple extractor and a second axis ripple $i_{oD\_signal\_q}$ of the synchronous coordinate system for the AC $i_{oD}$ that is extracted by the second ripple extractor.

9. The apparatus of claim 4, wherein the compensation value generator comprises:
- a first generator that generates a first axis voltage in a stationary coordinate system based on a first axis ripple $I_{DC\_signal\_d}$ of the synchronous coordinate system for the DC that is extracted by the first ripple extractor and a first axis ripple $i_{oQ\_signal\_d}$ of the synchronous coordinate system for the AC $I_{oQ}$ that is extracted by the third ripple extractor; and
- a second generator that generates a second axis voltage in the stationary coordinate system based on a second axis ripple $I_{DC\_signal\_q}$ of the synchronous coordinate system for the DC that is extracted by the first ripple extractor and a second axis ripple $i_{oQ\_signal\_q}$ of the synchronous coordinate system for the AC $I_{oQ}$ that is extracted by the third ripple extractor.

10. The apparatus of claim 9, wherein the second generator comprises:
- a first subtractor that subtracts the second axis ripple $I_{DC\_signal\_q}$ for the DC from a second axis command $I^*_{DC\_signal\_q}$ of the synchronous coordinate system for a DC ripple current;
- a first PID controller that controls an output of the first subtractor by using PID control;
- a limit controller that limits an output of the first PID controller to a critical value or less;
- a second subtractor that subtracts the second axis ripple $i_{oQ\_signal\_q}$ of the synchronous coordinate system for the AC $I_{oQ}$ from an output of the limit controller; and
- a second PID controller that outputs a second axis voltage in the stationary coordinate system by controlling an output of the second subtractor by using PID control.

11. The apparatus of claim 9, wherein the ripple compensator performs compensation by converting a voltage of a synchronous coordinate system for controlling the inverter into a voltage of a stationary coordinate system and adding the voltage of the stationary coordinate system to a voltage of the stationary coordinate system that is generated by the compensation value generator.

12. The apparatus of claim 9, wherein the ripple compensator performs compensation by converting a voltage of a stationary coordinate system that is generated by the compensation value generator into a voltage of a synchronous coordinate system and adding the voltage of the synchronous coordinate system to a voltage of a synchronous coordinate system for controlling the inverter, and then converting a result obtained after the compensation into a stationary coordinate system and outputting the stationary coordinate system.

13. The apparatus of claim 9, wherein the first generator comprises:
- a first subtractor that subtracts the first axis ripple $I_{DC\_signal\_d}$ of the synchronous coordinate system for the DC from a first axis command $I^*_{DC\_signal\_d}$ of the synchronous coordinate system for a DC ripple current;
- a first proportional integral derivative (PID) controller that controls an output of the first subtractor by using PID control;
- a limit controller that limits an output of the first PID controller to a critical value or less;
- a second subtractor that subtracts the first axis ripple $i_{oQ\_signal\_d}$ of the synchronous coordinate system for the AC $I_{oQ}$ from an output of the limit controller; and
- a second PID controller that outputs a first axis voltage in the stationary coordinate system by controlling an output of the second subtractor by using PID control.

14. A method of compensating for a current ripple of an inverter, the method comprising:

sensing a direct current (DC) that is input to the inverter and an alternating current (AC) that is output from the inverter, wherein the sensing is performed by a current sensor;

converting the sensed AC into a synchronous coordinate system, wherein the converting is performed by a coordinate converter;

extracting a ripple by using the sensed DC and an AC of the obtained synchronous coordinate system, wherein the extracting is performed by a ripple extractor;

generating a compensation value based on the extracted ripple, wherein the generating is performed by using a compensation value generator; and removing the ripple of the DC by using the generated compensation value, wherein the removing is performed by a ripple compensator.

15. The method of claim 14, wherein the converting into the synchronous coordinate system comprises,
when the inverter is a single-phase inverter, converting a single-phase AC that is sensed by the current sensor and an AC obtained by shifting the single-phase AC by 90° into a synchronous coordinate system ($i_{oD}$, $I_{oQ}$).

16. The method of claim 14, wherein the converting into the synchronous coordinate system comprises,
when the inverter is a 3-phase inverter, converting a 3-phase AC that is sensed by the current sensor into a 2-phase stationary coordinate system and converting again the 2-phase stationary coordinate system into a synchronous coordinate system.

17. The method of claim 16, wherein the extracting of the ripple comprises:
extracting a first ripple from a DC $I_{DC}$ that is sensed by the current sensor, and converting the extracted first ripple and a ripple obtained by shifting the extracted first ripple by 90° into a synchronous coordinate system ($I_{DC\_signal\_q}$, $I_{DC\_signal\_d}$);
extracting a second ripple from the AC ($i_{oD}$) of the synchronous coordinate system, and converting the extracted second ripple and a ripple obtained by shifting the extracted second ripple by 90° into a synchronous coordinate system ($i_{oD\_signal\_q}$, $i_{oD\_signal\_d}$); and
extracting a third ripple from the AC $I_{oQ}$) of the synchronous coordinate system, and converting the extracted third ripple and a ripple obtained by shifting the extracted third ripple by 90° into a synchronous coordinate system ($i_{oQ\_signal\_q}$, $i_{oQ\_signal\_d}$).

18. The method of claim 17, wherein the generating of the compensation value comprises:
generating a first axis voltage in a stationary coordinate system based on a first axis ripple $I_{DC\_signal\_d}$ of the synchronous coordinate system for the DC and a first axis ripple $i_{oQ\_signal\_d}$ of the synchronous coordinate system for the AC $I_{oQ}$; and
generating a second axis voltage in the stationary coordinate system based on a second axis ripple $I_{DC\_signal\_q}$ of the synchronous coordinate system for the DC and a second axis ripple $i_{oQ\_signal\_q}$ of the synchronous coordinate system for the AC $I_{oQ}$.

19. The method of claim 18, wherein the removing of the ripple comprises performing compensation by converting a voltage of a synchronous coordinate system for controlling the inverter into a voltage of a stationary coordinate system and adding the voltage of the stationary coordinate system to a voltage of the stationary coordinate system that is generated when the compensation value is generated.

20. The method of claim 18, wherein the removing of the ripple comprises performing compensation by converting a voltage of a stationary coordinate system that is generated when the compensation value is generated into a voltage of a synchronous coordinate system and adding the voltage of the synchronous coordinate system to a voltage of a synchronous coordinate system for controlling the inverter, and then converting a result obtained after the compensation into a stationary coordinate system and outputting the stationary coordinate system.

21. An apparatus for compensating for a voltage ripple of an inverter, the apparatus comprising:
a reference voltage input unit that receives a reference voltage for inverter control;
a ripple extractor that extracts a ripple from the reference voltage that is received by the reference voltage input unit;
a delay compensation unit that compensates for a time delay of the ripple that is extracted by the ripple extractor;
a ripple compensator that compensates for a ripple of the reference voltage that is input to the inverter based on the ripple whose time delay is compensated for by the delay compensation unit; and
a coordinate converter that converts the reference voltage whose ripple is compensated for by the ripple compensator into a stationary coordinate system.

22. The apparatus of claim 21, wherein the ripple extractor comprises:
a first filter that removes a twice component of an output frequency in the reference voltage; and
a second filter that extracts a ripple corresponding to the output frequency from the reference voltage from which the twice component of the output frequency is removed by the first filter.

23. The apparatus of claim 22, wherein the delay compensation unit comprises:
a delay compensator that compensates for a time delay of the ripple that is extracted by the second filter; and
a multiplier that outputs a final ripple by multiplying the ripple whose time delay is compensated for by the delay compensator by a compensation value.

24. The apparatus of claim 23, wherein the ripple compensation unit compensates for the ripple of the reference voltage that is input to the inverter by subtracting the final ripple from the reference voltage that is input to the inverter.

25. A method of compensating for a voltage ripple of an inverter, the method comprising:
receiving a reference voltage for inverter control, wherein the receiving is performed by a reference voltage input unit;
extracting a ripple from the received reference voltage, wherein the extracting is performed by a ripple extractor;
compensating for a time delay of the extracted ripple, wherein the compensating is performed by a delay compensator;
compensating for a ripple of the reference voltage that is input to the inverter based on the ripple whose time delay is compensated for, wherein the compensating is performed by a ripple compensator; and
converting the reference voltage whose ripple is compensated for into a stationary coordinate system, wherein the converting is performed by a coordinate converter.

26. The method of claim 25, wherein the extracting of the ripple comprises:
removing a twice component of an output frequency from the reference voltage; and extracting a ripple corresponding to the output frequency from the reference voltage from which the twice component of the output frequency is removed.

27. The method of claim 26, wherein the compensating of the time delay comprises:
compensating for the time delay of the extracted ripple; and
outputting a final ripple by multiplying the ripple whose time delay is compensated for by a compensation value.

28. The method of claim 27, wherein the compensating of the ripple comprises compensating for the ripple of the reference voltage that is input to the inverter by subtracting the final ripple from the reference voltage that is input to the inverter.

29. A method of compensating for an offset of a signal for inverter control, the method comprising:
sampling and detecting an input alternating current (AC) voltage for controlling an inverter at each predetermine time interval;
calculating a voltage sum value of the input AC voltage that is detected at each predetermined time interval;
determining whether a cycle of the input AC voltage is equal to or greater than a predetermined cycle;
when it is determined that the cycle of the input AC voltage is equal to or greater than the predetermined cycle, calculating a voltage average value per cycle of the voltage sum value;
determining whether the calculated voltage average value exceeds a first critical value; and
when it is determined that the calculated voltage average value exceeds the first critical value, compensating for an offset component corresponding to the voltage average value.

30. The method of claim 29, wherein the determining of whether the cycle of the input AC voltage is equal to or greater than the predetermined cycle comprises counting a number of times a magnitude of the input AC voltage changes from a negative value to a positive value or a number of times the magnitude of the input AC voltage changes from a positive value to a negative value.

31. The method of claim 29, further comprising:
determining whether the voltage average value exceeds a second critical value; and
when it is determined that the voltage average value exceeds the second critical value, outputting an alarm signal indicating that there is an abnormality in the input AC voltage.

32. A method of compensating for an offset of a signal for inverter control, the method comprising:
sampling and detecting an input alternating current (AC) for controlling an inverter at each predetermined time interval;
calculating a current sum value of the input AC that is detected at each predetermined time interval;
determining whether a cycle of the input AC is equal to or greater than a predetermined cycle;
when it is determined that the cycle of the input AC is equal to or greater than the predetermined cycle, calculating a current average value per cycle of the current sum value;
determining whether the calculated current average value exceeds a third critical value; and
when it is determined that the current average value exceeds the third critical value, compensating for an offset component corresponding to the current average value.

33. The method of claim 32, wherein the determining of whether the cycle of the input AC is equal to or greater than the predetermined cycle comprises counting a number of times a magnitude of the input AC changes from a negative value to a positive value or a number of times the magnitude of the input AC changes from a positive value to a negative value.

34. The method of claim 32, further comprising, after the detecting of the input AC, determining whether a magnitude of the input AC is equal to or greater than a predetermined current value, and
when it is determined that the magnitude of the input AC is equal to or greater than the predetermined current value, calculating the current sum value of the input AC, and when it is determined that the magnitude of the input AC is less than the predetermined current value, detecting the input AC.

35. The method of claim 32, further comprising:
determining whether the current average value exceeds a fourth critical value; and
when it is determined that the current average value exceeds the fourth critical value, outputting an alarm signal indicating that there is an abnormality in the input AC.

36. An apparatus for compensating for an offset of a signal for inverter control, the apparatus comprising:
a voltage detector that samples and detects an input alternating current (AC) voltage for controlling an inverter at each predetermined time interval;
a voltage sum unit that calculates a voltage sum value of the input AC voltage that is detected at each predetermined time interval;
a voltage cycle detector that determines whether a cycle of the input AC voltage is equal to or greater than a predetermined cycle;
a voltage average value calculator that, when it is determined that the cycle of the input AC voltage is equal to or greater than the predetermined cycle, calculates a voltage average value per cycle of the voltage sum value; and
a voltage offset compensator that determines whether the calculated voltage average value exceeds a first critical value, and when it is determined that the voltage average value exceeds the first critical value, compensates for an offset component corresponding to the voltage average value.

37. The apparatus of claim 36, wherein the voltage cycle detector determines the cycle of the input AC voltage by counting a number of times a magnitude of the input AC voltage changes from a negative value to a positive value or a number of times the magnitude of the input AC voltage changes from a positive value to a negative value.

38. The apparatus of claim 36, further comprising a voltage alarm signal output unit that outputs an alarm signal indicating that there is an abnormality in the input AC voltage,
wherein the voltage offset compensator determines whether the voltage average value exceeds a second critical value, and when it is determined that the voltage average value exceeds the second critical value, controls the voltage alarm signal output unit to output the alarm signal.

39. An apparatus for compensating for an offset of a signal for inverter control, the apparatus comprising:
a current detector that samples and detects an input alternating current (AC) for controlling an inverter at each predetermined time interval;

a current summing unit that calculates a current sum value of the input AC that is detected at each predetermined time interval;

a current cycle detector that determines whether a cycle of the input AC is equal to or greater than a predetermined cycle;

a current average value calculator that, when it is determined that the cycle of the input AC is equal to or greater than the predetermined cycle, calculates a current average value per cycle of the current sum value; and a current offset compensator that determines whether the calculated current average value exceeds a third critical value, and when it is determined that the current average value exceeds the third critical value, compensates for an offset component corresponding to the current average value.

40. The apparatus of claim 39, further comprising a current comparator that determines whether a magnitude of the input AC is equal to or greater than a predetermined current value, wherein when it is determined that the magnitude of the input AC is equal to or greater than the predetermined current value, the current summing unit calculates the current sum value of the input AC, and when it is determined that the magnitude of the input AC is less than the predetermined current value, the current detector detects the input AC.

41. The apparatus of claim 39, wherein the current cycle detector determines the cycle of the input AC by counting a number of times a magnitude of the input AC changes from a negative value to a positive value or a number of times the magnitude of the input AC changes from a positive value to a negative value.

42. The apparatus of claim 39, further comprising a current alarm signal output unit that outputs an alarm signal indicating that there is an abnormality in the input AC, wherein the current offset compensator determines whether the current average value exceeds a fourth critical value, and when it is determined that the current average value exceeds the fourth critical value, controls the current alarm signal output unit to output the alarm signal.

* * * * *